(12) United States Patent
Safavi

(10) Patent No.: US 12,289,194 B2
(45) Date of Patent: Apr. 29, 2025

(54) SYSTEMS AND METHODS FOR A VIRTUAL NETWORK ASSISTANT

(71) Applicant: Juniper Networks, Inc., Sunnyvale, CA (US)

(72) Inventor: Ebrahim Safavi, Santa Clara, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 18/306,670

(22) Filed: Apr. 25, 2023

(65) Prior Publication Data

US 2023/0261931 A1 Aug. 17, 2023

Related U.S. Application Data

(63) Continuation of application No. 17/198,638, filed on Mar. 11, 2021, now Pat. No. 11,677,612, which is a continuation of application No. 16/279,243, filed on Feb. 19, 2019, now Pat. No. 10,985,969.

(51) Int. Cl.
*H04L 41/0631* (2022.01)
*H04L 41/5019* (2022.01)

(52) U.S. Cl.
CPC ...... *H04L 41/0631* (2013.01); *H04L 41/5019* (2013.01)

(58) Field of Classification Search
None
See application file for complete search history.

(56) References Cited

U.S. PATENT DOCUMENTS

| | | | |
|---|---|---|---|
| 5,737,739 A | 4/1998 | Shirley et al. | |
| 7,536,595 B1 | 5/2009 | Hiltunen et al. | |
| 8,051,330 B2 | 11/2011 | Cinato et al. | |
| 8,423,047 B1 * | 4/2013 | Zang | H04W 64/003 370/332 |
| 9,832,082 B2 | 11/2017 | Dade et al. | |
| 10,200,884 B2 | 2/2019 | Tan et al. | |
| 10,270,644 B1 * | 4/2019 | Valsecchi | G06N 5/04 |
| 10,419,274 B2 | 9/2019 | Stephens et al. | |
| 10,419,954 B1 | 9/2019 | Konstantakopoulos et al. | |
| 10,470,077 B1 * | 11/2019 | Kodaypak | H04W 4/14 |
| 10,862,742 B2 | 12/2020 | Singh | |
| 10,958,537 B2 | 3/2021 | Safavi | |
| 10,958,543 B2 | 3/2021 | Dade et al. | |
| 10,958,585 B2 | 3/2021 | Safavi | |

(Continued)

FOREIGN PATENT DOCUMENTS

| | | |
|---|---|---|
| CN | 101507185 A | 8/2009 |
| CN | 106130780 A | 11/2016 |

(Continued)

OTHER PUBLICATIONS

Response to Communication pursuant to Article 94(3) EPC dated Mar. 7, 2023, from counterpart European Application No. 20158139.4 filed Jul. 4, 2023, 11 pp.

(Continued)

*Primary Examiner* — Saad A. Waqas
(74) *Attorney, Agent, or Firm* — Shumaker & Sieffert, P.A.

(57) ABSTRACT

Methods and apparatus for identifying the root cause of deterioration of system level experience (SLE). Offending network components that caused the SLE deterioration are identified and corrective actions are taken.

17 Claims, 14 Drawing Sheets

(56) References Cited

U.S. PATENT DOCUMENTS

| | | | |
|---|---|---|---|
| 10,985,969 B2 | 4/2021 | Safavi | |
| 11,381,499 B1 | 7/2022 | Ramaswamy et al. | |
| 11,516,725 B1 | 11/2022 | Martin | |
| 2001/0011260 A1 | 8/2001 | Skaanning et al. | |
| 2004/0202159 A1 | 10/2004 | Matsubara et al. | |
| 2005/0050377 A1 | 3/2005 | Chan et al. | |
| 2005/0265255 A1 | 12/2005 | Kodialam et al. | |
| 2007/0066297 A1 | 3/2007 | Heidari-Bateni | |
| 2007/0260911 A1* | 11/2007 | Marilly | H04L 41/08 714/4.1 |
| 2010/0091676 A1* | 4/2010 | Moran | H04L 47/745 370/252 |
| 2011/0231704 A1* | 9/2011 | Ge | G06F 11/079 714/E11.029 |
| 2012/0243474 A1 | 9/2012 | Iyer et al. | |
| 2014/0136690 A1* | 5/2014 | Jain | H04L 67/63 709/224 |
| 2014/0172371 A1* | 6/2014 | Zhu | G06Q 10/00 702/185 |
| 2014/0269269 A1* | 9/2014 | Kovvali | H04W 24/04 370/252 |
| 2014/0355454 A1 | 12/2014 | Serban et al. | |
| 2015/0017975 A1 | 1/2015 | Sanneck et al. | |
| 2015/0215910 A1 | 7/2015 | Han et al. | |
| 2016/0162346 A1* | 6/2016 | Kushnir | G06F 11/079 714/37 |
| 2016/0226740 A1 | 8/2016 | Van Oost et al. | |
| 2016/0286409 A1 | 9/2016 | Kravets et al. | |
| 2016/0323763 A1 | 11/2016 | Xu et al. | |
| 2016/0352599 A1 | 12/2016 | Hui et al. | |
| 2017/0019291 A1 | 1/2017 | Tapia et al. | |
| 2017/0126445 A1* | 5/2017 | Hamouda | H04L 27/2666 |
| 2017/0272319 A1* | 9/2017 | Sheen | H04W 24/02 |
| 2017/0364819 A1* | 12/2017 | Yang | H04L 41/16 |
| 2017/0366993 A1* | 12/2017 | Bejerano | H04L 43/16 |
| 2018/0048427 A1 | 2/2018 | Ganjam et al. | |
| 2018/0048527 A1* | 2/2018 | Ganjam | H04L 61/5007 |
| 2019/0163594 A1 | 5/2019 | Hayden et al. | |
| 2019/0215796 A1* | 7/2019 | Poosamani | H04W 64/003 |
| 2019/0347148 A1 | 11/2019 | Gomes Pereira et al. | |
| 2019/0356553 A1 | 11/2019 | Mermoud et al. | |
| 2019/0373007 A1 | 12/2019 | Salunke et al. | |
| 2020/0022016 A1* | 1/2020 | Fenoglio | H04L 43/08 |
| 2020/0099592 A1* | 3/2020 | Mahindru | H04L 41/5019 |
| 2020/0145851 A1 | 5/2020 | Berlin et al. | |
| 2020/0162889 A1 | 5/2020 | Desai et al. | |
| 2020/0267047 A1 | 8/2020 | Safavi | |
| 2021/0012115 A1 | 1/2021 | Bodbyl et al. | |
| 2021/0034994 A1 | 2/2021 | Stocker et al. | |
| 2021/0044477 A1 | 2/2021 | Singh | |
| 2021/0089927 A9 | 3/2021 | Ryan et al. | |
| 2021/0112034 A1 | 4/2021 | Sundararajan et al. | |
| 2021/0133594 A1 | 5/2021 | Dinh et al. | |
| 2021/0160263 A1 | 5/2021 | Jiang et al. | |
| 2021/0168084 A1 | 6/2021 | Safavi | |
| 2021/0176143 A1 | 6/2021 | Dade et al. | |
| 2021/0226855 A1 | 7/2021 | Safavi | |
| 2021/0273845 A1 | 9/2021 | Safavi | |
| 2021/0306201 A1 | 9/2021 | Wang et al. | |
| 2021/0390423 A1 | 12/2021 | Latapie et al. | |
| 2023/0053044 A1 | 2/2023 | Wang et al. | |

FOREIGN PATENT DOCUMENTS

| | | |
|---|---|---|
| CN | 108768702 A | 11/2018 |
| CN | 111585781 A | 8/2020 |
| EP | 3407541 A1 | 11/2018 |
| EP | 3700133 A1 | 8/2020 |
| EP | 3758295 A1 | 12/2020 |
| EP | 3799356 A1 | 3/2021 |
| JP | 2009509412 A | 3/2009 |
| JP | 2011028339 A | 2/2011 |
| JP | 2017509169 A | 3/2014 |
| JP | 2018506245 A | 3/2018 |
| JP | 2018514103 A | 5/2018 |
| JP | 2019536397 A | 12/2019 |
| JP | 2020137126 A | 8/2020 |
| WO | 2016107982 A1 | 7/2016 |
| WO | 2018093916 A1 | 5/2018 |
| WO | 2020150564 A1 | 7/2020 |

OTHER PUBLICATIONS

"Australian Application Serial No. 2020201136, First Examination Report mailed Sep. 8, 2020", 9 pages.
"Betweenness centrality," Wikipedia, The Free Encyclopedia, last edited on Apr. 18, 2021, Retrieved from: https://web.archive.org/web/20210418161442/https://en.wikipedia.org/wiki/Betweenness_centrality, accessed Nov. 19, 2021, 7 pp.
"Chinese Application Serial No. 202010099983.4, Voluntary Amendment filed Dec. 10, 2020", w English Claims, 24 pages.
"European Application Serial No. 20158139.4, Extended European Search Report mailed Jun. 9, 2020", 8 pages.
Communication pursuant to Article 94(3) EPC from counterpart European Application No. 20158139.4 dated Mar. 7, 2023, 4 pp.
Examination Report from counterpart European Application No. 20158139.4, dated Mar. 10, 2021, 1 pp.
Examination Report from counterpart European Application No. 20158139.4, dated Sep. 7, 2021, 6 pp.
Examiner Requistion from counterpart Canadian Application No. 3,069,905 dated Mar. 18, 2021, 4 pp.
First Office Action and Search Report from counterpart Chinese Application No. 202010099983.4 dated Sep. 22, 2022, 8 pp.
Gencaga, D, et al., "Survey on the Estimation of Mutual Information Methods as A Measure of Dependency Versus Correlation Analysis", AIP Conference Proceedings 1636, 80, (2014), 10 pages.
IEEE Std 802.11ad-2012: "Part 11: Wireless LAN Medium Access Control (MAC) and Physical Layer (PHY) Specifications—Amendment 3: Enhancements for Very High Throughput in the 60 GHz Band", LAN/MAN Standards Committee of the IEEE Computer Society, Dec. 28, 2012, 628 Pages.
Mist, "Enabling the AI-Driven Enterprise", Solution Brief | Mist Platform, Jul. 2020, 4 pp., Retrieved from the Internet on Dec. 8, 2021 from URL: https://www.juniper.net/content/dam/www/assets/solution-briefs/us/en/enabling-the-ai-driven-enterprise.pdf.
Mist, "Solution Brief; Mist Platform Enabling the AI-Drive Enterprise", Cupertino, CA, USA, Jul. 21, 2020, pp. 1-4, XP055870404, URL: https://www.juniper.net/content/dam/www/assets/solution-briefs/us/en/enabling-the-ai-driven-enterprise.pdf.
Prosecution History from U.S. Appl. No. 16/279,243, filed Sep. 22, 2020 through Feb. 22, 2021, 57 pp.
Prosecution History from U.S. Appl. No. 17/198,638, filed Mar. 21, 2022 through May 1, 2023, 71 pp.
Response to Examination Report dated Mar. 10, 2021 from counterpart European Application No. 20158139.4, dated Mar. 17, 2021, 8 pp.
Response to Examination Report dated Sep. 7, 2021, from counterpart European Application No. 20158139.4 filed Jan. 10, 2022, 18 pp.
Response to Extended Search Report dated Jun. 9, 2020 from counterpart European Application No. 20158139.4, filed Feb. 26, 2021, 21 pp.
Safavi, "Baysian Inference: a Key Building Block of AN AI Foundation," The New Stack, Retrieved May 21, 2021 from: https://thenewstack.io/bayesian-inference-a-key-building-block-of-an-ai-foundation/, Jul. 9, 2018, 15 pp.
Safavi, "Building Blocks for AI: Mutual Information and the Pearson Correlation," The New Stack, Retrieved May 21, 2021 from: https://thenewstack.io/mutual-information-pearson-correlationbuilding-blocks-ai/, Mar. 23, 2018, 15 pp.
Translation of the Notification of Reason for Rejection from counterpart Japanese Application No. 2020-026002, dated Mar. 9, 2021, 5 pp.
Freeman, "A set of measures of centrality based on betweenness", Sociometry, vol. 40, No. 1, American Sociological Association, Mar. 1977, pp. 35-41.

(56) References Cited

OTHER PUBLICATIONS

Communication pursuant to Article 94(3) EPC from counterpart European Application No. 20158139.4 dated Feb. 7, 2025, 6 pp.

* cited by examiner

900a

| | 905 | 950 | 952 | 954 | 956 |
|---|---|---|---|---|---|
| User | 5CG8372ZLL | BC4313-SURFACE | Briphone | FDX9 |
| Connected Time | 24m | 3d 12h 28m | 11m | 3h 38m |
| IP Address | 192.168.101.139 | 192.168.101.16 | 192.168.101.108 | 192.168.101.20 |
| MAC Address | 04:d3:b0:f1:f4:c8 | bc:83:85:22:b1:69 | 58:40:4e:20:3b:ec | c4:b3:01:d4:75:3f |
| Device Type | Intel Corporate | Microsoft Corporatio | iPhone 7 | Mac MBP 13" early 20 |
| Device OS | Microsoft OS | Windows 10 | 12.0.1 | Mojave |
| AP Name | SCS-Mist-03-3e:f4:dd | SCS-Mist-02-3e:f4:d3 | SCS-Mist-03-3e:f4:dd | SCS-Mist-02-3e:f4:d3 |
| SSID | SCSGuest | SCSCompany | SCSCompany | SCSCompany |
| Channel | 44 | 165 | 6 | 165 |
| Band | 5 GHz | 5 GHz | 2.4 GHz | 5 GHz |
| AP MAC | 5c:5b:35:3e:f4:dd | 5c:5b:35:3e:f4:d3 | 5c:5b:35:3e:f4:dd | 5c:5b:35:3e:f4:d3 |
| BSSID | 5c:5b:35:37:95:42 | 5c:5b:35:37:94:e1 | 5c:5b:35:37:95:31 | 5c:5b:35:37:94:e1 |
| RSSI | -57 dBm | -60 dBm | -77 dBm | -63 dBm |
| SNR | 35 dB | 32 dB | 4 dB | 29 dB |
| RX Bit Rate | 2.9 kbps | 2.1 kbps | 0 bps | 0 bps |
| TX Bit Rate | 4.7 kbps | 2.6 kbps | 0 bps | 0 bps |
| Total Bytes | 131.5 MB | 3.7 GB | 592.1 kB | 1.6 MB |
| RX Bytes | 88 MB | 3.1 GB | 434.4 kB | 875 kB |
| TX Bytes | 43.5 MB | 572.8 MB | 157.7 kB | 0 B |
| Total Packets | 586.0 k | 4.3 M | 1.8 k | 0 k |
| TX Packets | 377.7 k | 2.0 M | 1.2 k | 0 k |
| Total Retries | 5.1 k | 928.2 k | 4.9 k | 0 k |

| | 905 | 950 | 952 | 954 | 956 |
|---|---|---|---|---|---|
| User | 5CG8372ZLL | BC4313-SURFACE | Briphone | FDX9 |
| Connected Time | 24m | 3d 12h 28m | 11m | 3h 38m |
| IP Address | 192.168.101.139 | 192.168.101.16 | 192.168.101.108 | 192.168.101.20 |
| MAC Address | 04:d3:b0:f1:f4:c8 | bc:83:85:22:b1:69 | 58:40:4e:20:3b:ec | c4:b3:01:d4:75:3f |
| Device Type | Intel Corporate | Microsoft Corporatio | iPhone 7 | Mac MBP 13" early 20 |
| Device OS | Microsoft OS | Windows 10 | 12.0.1 | Mojave |
| AP Name | SCS-Mist-03-3e:f4:dd | SCS-Mist-02-3e:f4:d3 | SCS-Mist-03-3e:f4:dd | SCS-Mist-02-3e:f4:dd |
| SSID | SCSGuest | SCSCompany | SCSCompany | SCSCompany |
| Channel | 44 | 165 | 6 | 165 |
| Band | 5 GHz | 5 GHz | 2.4 GHz | 5 GHz |
| AP MAC | 5c:5b:35:3e:f4:dd | 5c:5b:35:3e:f4:d3 | 5c:5b:35:3e:f4:dd | 5c:5b:35:3e:f4:d3 |
| BSSID | 5c:5b:35:37:95:42 | 5c:5b:35:37:94:e1 | 5c:5b:35:37:95:31 | 5c:5b:35:37:94:e1 |
| RSSI | -57 dBm | -60 dBm | -77 dBm | -63 dBm |
| SNR | 35 dB | 32 dB | 4 dB | 29 dB |
| RX Bit Rate | 2.9 kbps | 2.1 kbps | 0 bps | 0 bps |
| TX Bit Rate | 4.7 kbps | 2.6 kbps | 0 bps | 0 bps |
| Total Bytes | 131.5 MB | 3.7 GB | 592.1 kB | 1.6 MB |
| RX Bytes | 88 MB | 3.1 GB | 434.4 kB | 875 kB |
| TX Bytes | 43.5 MB | 572.8 MB | 157.7 kB | 0 B |
| Total Packets | 586.0 k | 4.3 M | 1.8 k | 0 k |
| TX Packets | 377.7 k | 2.0 M | 1.2 k | 0 k |
| Total Retries | 5.1 k | 928.2 k | 4.9 k | 0 k |
| Success-to-Connect SLE | P | P | P | F |
| Time-to-Connect SLE | P | P | P | F |
| Coverage SLE | P | P | F | P |
| Throughput SLE | p | p | p | NA |

FIGURE 9b

SYSTEMS AND METHODS FOR A VIRTUAL NETWORK ASSISTANT

This application is a continuation of U.S. patent application Ser. No. 17/198,638, filed 11 Mar. 2021, which is a continuation of U.S. patent application Ser. No. 16/279,243, filed 19 Feb. 2019, the entire content of each application is incorporated herein by reference.

FIELD

One exemplary aspect relates to monitoring wireless communications systems and, more particularly, methods and/or apparatus for determining the root cause of issues encountered by wireless network users.

BACKGROUND

Users of wireless complex networks, such as WiFi networks, may encounter degradation of system level experience (SLE) which can be a result of a variety of issues. When issues present themselves, to ensure high SLEs, it is critical to promptly identify the root cause of the issue and to initiate either manual or automated corrective measures. Given the fact that some of the mitigation actions may have an adverse impact on users that are experiencing proper a SLEs, it is important to ensure that the system has a high level of confidence that it has identified the root cause of the issue before invoking a corrective measure(s).

SUMMARY

What is needed is a system that can determine with a high probability which components of the system are the key suspects in causing the SLE degradation and provide a measure or estimation for a level of confidence in the determination.

One exemplary aspect describes methods for determining the root cause(s) of SLE degradation experienced by a client(s) and/or the network. The methods identify a portion or all of the potential issues with a client and the network, rank the likelihood of the various potential root causes based on their importance in causing those issues, and find the scope similarity of likelihood for each feature contributing to those issues. Specifically, the exemplary method identifies the root cause of an issue by obtaining an indicator regarding the measure of the mutual dependence between the observed issue and the various potential root causes of the issue. Once the root cause is identified, corrective measures can take place while minimizing the impact to other clients which are using the network. The corrective measure can be automatically initiated such as sending a reboot instruction to one or more pieces of equipment in the system.

Each SLE measurement is associated with the specific client/terminal/user equipment (UE) which measured the SLE, as well as with the wireless local area network (WLAN) (e.g., service set identifier, SSID) used (or attempted to be used) by the client, the specific radio band used, and the specific access point used in that interaction, optionally with any other relevant information. In addition, in accordance with yet another embodiment, the SLE measurements may be associated with a specific server attached to the network such as an authentication, authorization, and accounting (AAA) server, a dynamic host configuration protocol (DHCP) server, etc. As such, when a poor SLE is detected, the methods below at least provide means for detecting which one of these system components is the root cause of the identified SLE deterioration.

Identifying a Root Cause of a Poor SLE

A network management system in accordance with one exemplary aspect continuously or substantially continuously monitors indicators of SLE as well as monitors the system level experience of users. For example, the network management system may, and often does, monitor for each wireless device the connect time, throughput, coverage, capacity, roaming, success to connect, AP availability, etc. In accordance with one embodiment some of the parameters, e.g., level of received signal strength indicator (RSSI), are measured by each client and sent via an associated access point (AP) to the network management module over a local area network (LAN)/wide area network (WAN)/Internet. Other SLE parameters, e.g., failed attempts by a client to connect to the wireless network, are observed by an AP and reported to the network management module which keeps a count of the number of failed attempts of each specific client over a specific WLAN SSID and a specific AP. The count is measured over a predetermined time period, e.g., over a time window of an hour, three hours, a day, etc.

Some parameters are tracked as raw information. For example, the number of clients that fail to connect via a specific AP is monitored and continuously tracked. Other parameters such as the RSSI seen by a specific client may be compared to a predetermined threshold and the network management module tracks the number of RSSI occurrences below a predetermined threshold or above a predetermined threshold rather than track the actual value of the RSSI.

Each SLE observation is associated with the network component(s) over which the client attempted to associate with the network or successfully associated with the network. These network components can include one or more of clients/terminals/UEs, WLAN(s), radio band(s), AP, AAA server, DHCP server(s), etc. The processes described below construct for each one of the network components a measurement indicative of the probability that the identified component is the root cause of an observed poor SLE.

Specifically, for each one of the network components the method approximates the probability of the $i^{th}$ network component (feature), $f_i$, being problematic given the observation of failure, F, for a given client C:

$$P(f_i | F, C) = \frac{P(F | f_i)P(f_i, C)}{\sum_j P(F | f_j)P(f_j, C)} \qquad \text{Eq. 1}$$

Where:
$f_i$—a given network component (feature)
F—denotes an SLE failure
C—denotes a specific client
$P(f_i | F, C)$—probability that feature $f_i$ being problematic given the observation of SLE failure, F, on the specific client C
$P(F | f_i)$—probability of failure, F, given the fact that a specific network component $f_i$ was used
$P(f_i, C)$—probability that the specific network component (feature) was selected by the specific client C
$\sum_j$—denotes sum over all of the network components (features)

The network management system maintains site level counters for each successful and failed SLE and the associated network components over which the corresponding UE is associated (or attempted to associate) with the network. These counters are then used to calculate the $P(F|f_i)$ and the P(f_i, C) probabilities for each specific SLE. Specifically, the probability of failed SLE given a specific network component (feature) is estimated by:

$$P(F \mid f_i) = \frac{n(F, f_i)}{n(f_i)} \quad \text{Eq. 2}$$

Where:

P(F|f_i)—an estimated probability of a SLE failure, F, given the fact that a specific component of the network, f_i, is used n(f_i)—the number of occurrences of this specific network component's (feature) f_i n(F, f_i)—the number of failures observed associated with the said occurrences of the network component (feature) f_i Similarly, the probability that a specific network component f_i is used when we observe a failure of a specific client, C_F, is estimated by:

$$P(f_i, C_F) = \frac{n(f_i, F, C)}{n(C)} \quad \text{Eq. 3}$$

Where:

P(f_i, C_F) an estimated probability that a specific network component f_i is used when we observe an SLE failure of a specific client, C_F n(f_i, F, C)—number of a specific network components (features) that are associated with a client that experienced failed (poor) SLE n(C)—total number of SLE attempts made by that client over a specific time period For example, when attempting to estimate the probability that a poor SLE experience by a specific client C was caused by a specific network component f_i, the method first determines the number of failed SLEs of that specific client which involved the specific network component, n(f_i, F, C), and divides the resulting number by the total number of SLE attempts (both those which resulted in a good SLE and those that resulted in a poor SLE), n(C) made by that client over a specific time period. It should be noted that SLE attempts could be e.g., connection attempts, throughput attempts, or any other type of SLE attempt. In a specific illustrative example, equation 3 helps estimate how many times a specific client failed over different network routes/types, such as WLAN, AP and band.

Using the estimated probability values of equations 2 and 3 in equation 1 yields the following estimations for the probabilities/likelihood that a specific component e.g., WLAN, AP and band is the root cause of a failed (poor) SLE observed by a specific client.

Client failure likelihood = Eq. 4

$$\frac{N_F(\text{Client})P_F(\text{Client})}{N_F(\text{Client})P_F(\text{Client}) + \sum_i N_F(\text{Client } \& AP_i)P_F(AP_i) + \sum_j N_F(\text{Client } \& WLAN_j)P_F(WLAN_j) + \sum_k N_F(\text{Client } \& \text{Band}_k)P_F(\text{Band}_k)}$$

$AP_{i0}$ failure likelihood = Eq. 5

$$\frac{N_F(\text{Client } \& AP_{i0})P_F(AP_{i0})}{N_F(\text{Client})P_F(\text{Client}) + \sum_i N_F(\text{Client } \& AP_i)P_F(AP_i) + \sum_j N_F(\text{Client } \& WLAN_j)P_F(WLAN_j) + \sum_k N_F(\text{Client } \& \text{Band}_k)P_F(\text{Band}_k)}$$

$WLAN_{j0}$ failure likelihood = Eq. 6

$$\frac{N_F(\text{Client } \& WLAN_{j0})P_F(WLAN_{j0})}{N_F(\text{Client})P_F(\text{Client}) + \sum_i N_F(\text{Client } \& AP_i)P_F(AP_i) + \sum_j N_F(\text{Client } \& WLAN_j)P_F(WLAN_j) + \sum_k N_F(\text{Client } \& \text{Band}_k)P_F(\text{Band}_k)}$$

$Band_{k0}$ failure likelihood = Eq. 7

$$\frac{N_F(\text{Client } \& \text{Band}_{k0})P_F(\text{Band}_{k0})}{N_F(\text{Client})P_F(\text{Client}) + \sum_i N_F(\text{Client } \& AP_i)P_F(AP_i) + \sum_j N_F(\text{Client } \& WLAN_j)P_F(WLAN_j) + \sum_k N_F(\text{Client } \& \text{Band}_k)P_F(\text{Band}_k)}$$

$$P_F(f_i) = \frac{\sum \text{degraded } [f_i]}{\sum \text{Total } [f_i]} \quad \text{Eq. 8}$$

Where:

$N_F$(Client)—number of SLE failures for the given client $N_F$(Client & $AP_i$)—number of SLE failures for the given client over $AP_i$ $N_F$(Client & $WLAN_j$)—number of SLE failures for the given client over $WLAN_j$ $N_F$(Client & $Band_k$)—number of SLE failures for the given client over $Band_k$ degraded[$f_i$]—number of failed SLEs over feature $f_i$ Total[$f_i$]—total number of attempted SLEs over feature $f_i$ $P_F(f_i)$:—rate of SLE failure over feature $f_i$ Such as:

$P_F$(Client):—rate of client SLE failure $P_F(AP_i)$—rate of site-wide SLE failure over $AP_i$ $P_F(WLAN_j)$—rate of site-wide SLE failure over $WLAN_j$ $P_F(Band_k)$—rate of site-wide SLE failure rate over The system utilizes the root-cause analysis to estimate for each network component the probability that each component caused the observed poor SLE. A corrective measure(s) can then be taken against the component that is most likely to be the perpetrator and/or contributor to the cause of the issue.

Some of the corrective actions may require automated restarting of a specific network component impacting other clients/terminals/UEs which utilize that network component for their normal operations. If the system were to mistakenly identify a properly functioning network component as being the root cause of the poor SLE, restarting the wrong network component would not fix the issue, and even worse, it would adversely impact other clients which depend of that network component for continued operation.

To reduce the risk of taking corrective action against a network component that has been erroneously identified as a root cause of poor SLE experienced by a specific client, the system in accordance with one exemplary aspect examines the level of certainty the system has in its root cause identification. For example, if one client attempts to connect over a network component, e.g., a specific radio band, and fails, there is little information about the functionality of that specific radio band. However, if 100 clients attempt to connect over the same radio band and all fail, there is a much higher confidence that the specific network component (e.g., radio band) is faulty.

To identify the root cause of poor SLEs, the system can observe various SLE measurements by each one of the clients that attempted (some successfully and some unsuccessfully) to connect to the network. Additionally, for each attempt the system can, and often does, monitor and record the network components which were involved in the connection attempts. Based on these measurements and observations, the system can determine the probability of each network component being the root cause for the SLE degradation. Next the system determines the significance of the information the system has leading to making the root cause determination.

One exemplary aspect uses the notion of mutual information to determine the significance of the information that is utilized in the process of determining the root cause of SLE deterioration. The mutual information of two discrete random variables X and Y is provided by:

$$MI = \Sigma_i \Sigma_{SLE} P(f_i, SLE) * \log(P(f_i, SLE)/(P(f_i) * P(SLE))) \quad \text{Eq. 9}$$

Where:
MI—mutual information between the X and Y variables
$P(f_i, SLE)$—joint probability function of network feature $f_i$ and SLE
$P(f_i)$—marginal probability distribution functions of network feature $f_i$
$P(SLE)$—marginal probability distribution functions of SLE Mutual information tells us how important the network feature $f_i$ is at predicting the SLE random variable. However, mutual information doesn't tell us if the network feature is a predictor of success or failure. For that, an exemplary aspect uses the Pearson correlation as a sign operator to give polarity to the mutual information correlation. Pearson correlation is a measure of the strength and direction of association that exists between two variables. The Pearson correlation factor is a number between −1 and 1. A positive number indicates that when one variable increases, the other variable increases as well. A negative number indicates that when one variable increases, the value of the second variable decreases. A value of 0 indicates no linear correlation between two variables.

$$R_f(f_i, SLE) = S(f_i, SLE) * MI(f_i, SLE) \quad \text{Eq. 10}$$

Where:

$$S(f_i, SLE) = \quad \text{Eq. 11}$$

$$\text{sign}\left(\frac{E\{(f_i - \mu_{f_i})(SLE - \mu_{SLE})\}}{\sigma_{f_i} \sigma_{SLE}}\right) = \text{sign}(E\{(f_i - \mu_{f_i})(SLE - \mu_{SLE})\})$$

Where:
$R_f(\cdot)$—the mutual information correlation also referred as scope of impact
$S(\cdot)$—indicates the polarity of the predictor
$MI(\cdot)$—measures the mutual information between two random variables
$\text{sign}(\cdot)$—indicates the sign operator
$E\{\cdot\}$—shows the average operator
$f_i$—denotes a given network component
SLE—denotes the SLE value i.e., +1 for success and 0 for failure $\mu$—demonstrates the average of a random variable
$\sigma$—represents the variance of a random variable Network features that may contribute to failed SLEs have a negative Pearson correlation while those which may contribute to success SLEs would have a positive Pearson correlation.

For example, assume the system collected only three observations within a specific time period:
(C, AP1, Ch1; SLE=F)—client C failed to connect to the network over AP1 and channel $Ch_1$
(C, AP1, Ch2; SLE=S)—client C successfully connected to the network over channel $Ch_2$ of AP1
(C, AP2, Ch1; SLE=F)—client C failed to connect to the network over AP2 and channel $Ch_1$ The probability that any of these network components including client C, access points AP1 and AP2 and channels Ch. 1 and Ch. 2 is the root cause of the failed connection can be calculated using equations 4 through 7 above:

Client failure likelihood$(2*\frac{2}{3})/((2*\frac{2}{3})+1*0.5+1*1+2*1+0)=(\frac{4}{3})/(\frac{4}{3}+0.5+1+2)=0.275862$ \quad Eq. 12

$AP_1$ failure likelihood$=(1*0.5)/(2*(\frac{2}{3})+1*0.5+1*1+2*1+0*0)=0.5/(\frac{4}{3}+0.5+1+2)=0.103448$ \quad Eq. 13

$AP_2$ failure likelihood$=(1*1)/(2*(\frac{2}{3})+1*0.5+1*1+2*1+0)=1/(\frac{4}{3}+0.5+1+2)=0.206897$ \quad Eq. 14

$Ch_1$ failure likelihood$2*1/((2*\frac{2}{3})+1*0.5+1*1+2*1+0)=2/(\frac{4}{3}+0.5+1+2)=0.41379$ \quad Eq. 15

$Ch_2$ failure likelihood$=0$ \quad Eq. 16

The mutual information that these observations provide about the hypothesis that any one of the network components is the root cause of the failed connections can then be calculated by using equation 8. Specifically, the supporting mutual information for the hypothesis that the failure is caused by a failed $AP_1$ is calculated by:

$$I(Ap1, F) = \quad \text{Eq. 17}$$

$$P(Ap1, F)\log\left(\frac{P(Ap1, F)}{P(Ap1)P(F)}\right) + P(\tilde{Ap}1, F)\log\left(\frac{P(\tilde{Ap}1, F)}{P(\tilde{Ap}1)P(F)}\right) +$$

$$P(Ap1, \tilde{F})\log\left(\frac{P(Ap1, \tilde{F})}{P(Ap1)P(\tilde{F})}\right) + P(\tilde{Ap}1, \tilde{F})\log\left(\frac{P(\tilde{Ap}1, \tilde{F})}{P(\tilde{Ap}1)P(\tilde{F})}\right) =$$

$$1/3 * \log(1/3/(2/3 * 2/3)) + 1/3 * \log(1/3/(1/3 * 2/3)) +$$

$$1/3 * \log(1/3/(2/3 * 1/3)) = 0.252$$

$\mu_{AP1} = 0.66, \mu_{SLE} = 0.33, \sigma_{AP1} = 0.22, \sigma_{SLE} = 0.22$ $S(AP_1, SLE) = \text{Sign}(0.5) = +1$ The supporting mutual information for the hypothesis that the failure is caused by a failed channel 1 ($Ch_1$) is calculated by:

$$I(Ch1, F) = \quad \text{Eq. 18}$$

$$P(Ch1, F)\log\left(\frac{P(Ch1, F)}{P(Ch1)P(F)}\right) + P(\tilde{Ch}1, F)\log\left(\frac{P(\tilde{Ch}1, F)}{P(\tilde{Ch}1)P(F)}\right) +$$

$$P(Ch1, \tilde{F})\log\left(\frac{P(Ch1, \tilde{F})}{P(Ch1)P(\tilde{F})}\right) + P(\tilde{Ch}1, \tilde{F})\log\left(\frac{P(\tilde{Ch}1, \tilde{F})}{P(\tilde{Ch}1)P(\tilde{F})}\right) =$$

-continued $$1 * \log(1/(1/3 * 1/3)) + 1/3\log(1/3/(1/3 * 1/3)) = 0.9183$$

$$\mu_{Ch1} = 0.66, \mu_{SLE} = 0.33, \sigma_{Ch1} = 0.22, \sigma_{SLE} = 0.22$$

$$S(Ch_1, SLE) = \text{Sign}(-1.0) = -1$$

The supporting mutual information for the hypothesis that the failure is caused by a failed $AP_2$ is calculated by:

$$I(Ap2, F) =$$ Eq. 19

$$P(Ap2, F)\log\left(\frac{P(Ap2, F)}{P(Ap2)P(F)}\right) + P(\tilde{Ap2}, F)\log\left(\frac{P(\tilde{Ap2}, F)}{P(\tilde{Ap2})P(F)}\right) +$$

$$P(Ap2, \tilde{F})\log\left(\frac{P(Ap2, \tilde{F})}{P(Ap2)P(\tilde{F})}\right) + P(\tilde{Ap2}, \tilde{F})\log\left(\frac{P(\tilde{Ap2}, \tilde{F})}{P(\tilde{Ap2})P(\tilde{F})}\right) =$$

$$1/3 * \log(1/3/(1/3 * 2/3)) + 1/3 * \log(1/3/(2/3 * 2/3)) +$$

$$1/3 * \log2(1/3/(2/3 * 1/3)) = 0.252$$

$$\mu_{AP2} = 0.33, \mu_{SLE} = 0.33, \sigma_{AP2} = 0.22, \sigma_{SLE} = 0.22$$

$$S(AP_2, SLE) = \text{Sign}(-0.5) = -1$$

The supporting mutual information for the hypothesis that the failure is caused by a failed Channel 2 ($Ch_2$) is calculated by:

$$I(Ch2, F) =$$ Eq. 20

$$P(Ch2, F)\log\left(\frac{P(Ch2, F)}{P(Ch2)P(F)}\right) + P(\tilde{Ch2}, F)\log\left(\frac{P(\tilde{Ch2}, F)}{P(\tilde{Ch2})P(F)}\right) +$$

$$P(Ch2, \tilde{F})\log\left(\frac{P(Ch2, \tilde{F})}{P(Ch2)P(\tilde{F})}\right) + P(\tilde{Ch2}, \tilde{F})\log\left(\frac{P(\tilde{Ch2}, \tilde{F})}{P(\tilde{Ch2})P(\tilde{F})}\right) =$$

$$2/3\log(2/3/(2/3 * 2/3)) + 1/3\log(1/3/(1/3 * 1/3)) = 0.756$$

$$\mu_{Ch2} = 0.33, \mu_{SLE} = 0.33, \sigma_{Ch2} = 0.22, \sigma_{SLE} = 0.22$$

$$S(Ch_2, SLE) = \text{Sign}(-1.0) = +1$$

TABLE 1

| Component | Failure likelihood | Mutual information correlation |
|---|---|---|
| Client | 0.275 | 0.0 |
| $AP_1$ | 0.103 | +0.252 |
| $AP_2$ | 0.206 | −0.252 |
| $Ch_1$ | 0.414 | −0.918 |
| $Ch_2$ | 0.0 | +0.756 |

Referring to Table 1, it becomes clear that channel 1 is the most likely root cause of the issue as its likelihood is the highest and the mutual information is the most negative. As channel 1 always appears with failures, the mutual information correlation (scope of impact) has negative polarity (almost −1).

In accordance with one specific embodiment, the system may take an action such as automatically restarting a network component that has the highest probability of being the root cause of the issues experienced by users (such as not being able to connect over the network, experiencing slow connect time, experiencing low bit rate, etc.). To restart the offending network component, the network management system issues a control message to the offending component or to a network component associated with the offending network component, instructing it to restart the offending component.

In accordance with yet another embodiment, once the system identifies the component with the highest probability of being the root cause of the issues experienced by users, the system first examines the mutual information that supports the hypothesis that the component is the root cause of the issues experienced by the users. The system then compares the mutual information to a predetermined threshold, e.g., −0.20 (although any threshold can be used), and only if the mutual information correlation associated with the component is lower than the threshold, the system takes automated action such as restarting a component. In case the mutual information is greater than (or equal to) the threshold, the system waits to collect additional information or just alerts the system administrator and provides the system administrator with statistics such as those highlighted in table 1.

BRIEF DESCRIPTION OF THE FIGURES

The embodiments herein may be better understood by referring to the following description in conjunction with the accompanying drawings in which like reference numerals indicate identically or functionally similar elements, of which:

FIG. 9a illustrates a table used to store exemplary SLE related parameters;

FIG. 9b illustrates a table used to store exemplary SLE related parameters and the derived SLE parameters.

DETAILED DESCRIPTION

Figure 1:
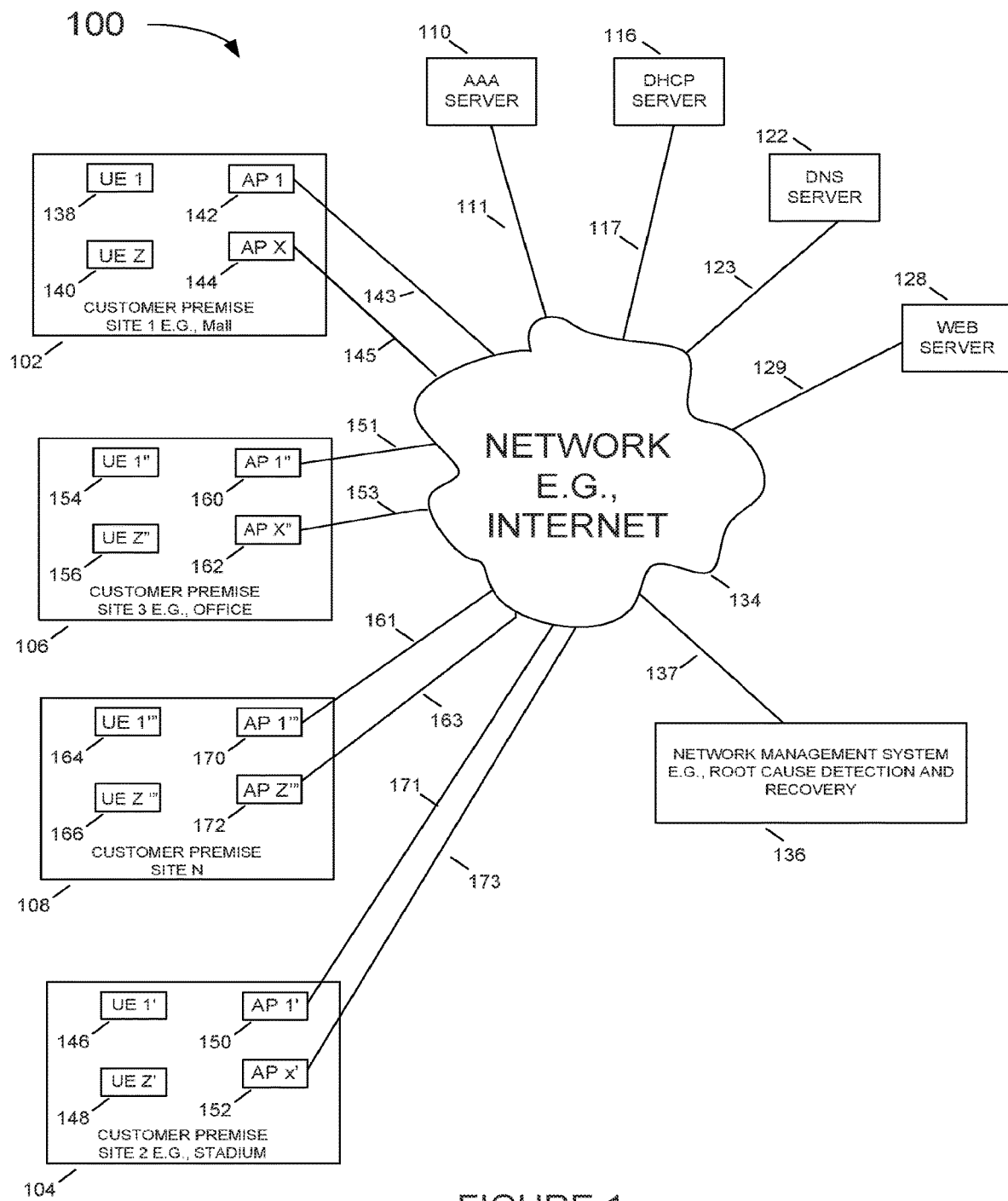
FIG. 1 is a block diagram illustrating an embodiment of an exemplary network environment.

FIG. 1 illustrates an exemplary system 100 implemented in accordance with an exemplary embodiment. Exemplary system 100 includes a plurality of access points (AP1 142, ..., AP X 144, AP 1' 150, ..., AP X' 152, AP 1" 160, ..., AP X" 162, AP 1'" 170, ..., AP X'" 172), a plurality of Authentication, Authorization and Accounting (AAA) servers (only one AA server 110 is shown), a plurality of Dynamic Host Configuration Protocol (DHCP) servers (only one DHCP server 116 is shown), a plurality of Domain Name System (DNS) severs (only one DNS server 122 is shown), a plurality of Web servers (only one Web server 128 is shown), and a network management system (NMS) 136, e.g., an access point management system, which are coupled together via network 134, e.g., the Internet and/or an enterprise intranet. Network communications links (143, 145, 151, 153, 161, 163, 171, 173) couple the access points (AP1 142, AP X 144, AP 1' 150, AP X' 152, AP 1" 160, AP X" 162, AP 1'" 170, AP X'" 172), respectively, to network 134. Network communications link 111 couples the AA servers (only AA server 110 is shown) to network 134. Network communications link 117 couples the DHCP servers (only one DHCP server 116 is shown) to network 134. Network communications link 123 couples the DNS servers (only one DNS server 122 is shown) to network 134. Network communications link 129 couples the Web servers (only one Web server 128 is shown) to network 134. Exemplary system 100 further includes a plurality of clients or user equipment devices (UE 1 138, . . . , UE Z 140, UE 1' 146, . . . , UEZ' 148, UE 1" 154, . . . , UE Z" 156, UE 1'" 164, UE Z'" 166). At least some of the UEs (138, 140, 146, 148, 154, 156, 164, 166) are wireless devices which may move throughout system 100.

In exemplary system 100, sets of access points are located at different customer premise site(s). Customer premise site 1 102, e.g., a mall, includes access points (AP 1 142, . . . , AP X 144). Customer premise site 2 104, e.g., a stadium, includes access points (AP 1' 150, . . . , AP X' 152). Customer premise site 3 106, e.g., an office, includes access points (AP 1" 160, . . . , AP X" 162). Customer premise site N 108 includes access points (AP 1'" 170, . . . , AP X'" 172). As shown in FIG. 1, UEs (UE 1 138, . . . , UE Z 140) are currently located at customer premise site 1 102; UEs (UE 1' 146, . . . , UE Z' 148) are currently located at customer premise site 2 104; UEs (UE 1" 154, . . . , UE Z" 156) are currently located at customer premise site 3 106; and UEs (UE 1'" 164, . . . , UE Z'" 166) are currently located at customer premise site N 108.

The network management system, 136, continuously collects SLE statistics related to the performance experienced by a portion or all of the clients or UEs described above. Whenever SLE degradation is experienced, the network management system, 136, calculates the probability and mutual information associated with each network component that this component is the root cause of the underlying issue that causes the SLE degradation. The results of the calculated information, such as the one provided in Table 1, may be presented to the system administrator and when indicated, the system can automatically restart the offending component in an attempt to restore proper SLE. The network management system, 136, can restart the offending component by sending a restart command message to the offending message, sending a power cycling message to the power supply of the offending component, sending a restart command to other network components associated with the offending component, or any other suitable restart instruction.

Figure 2:
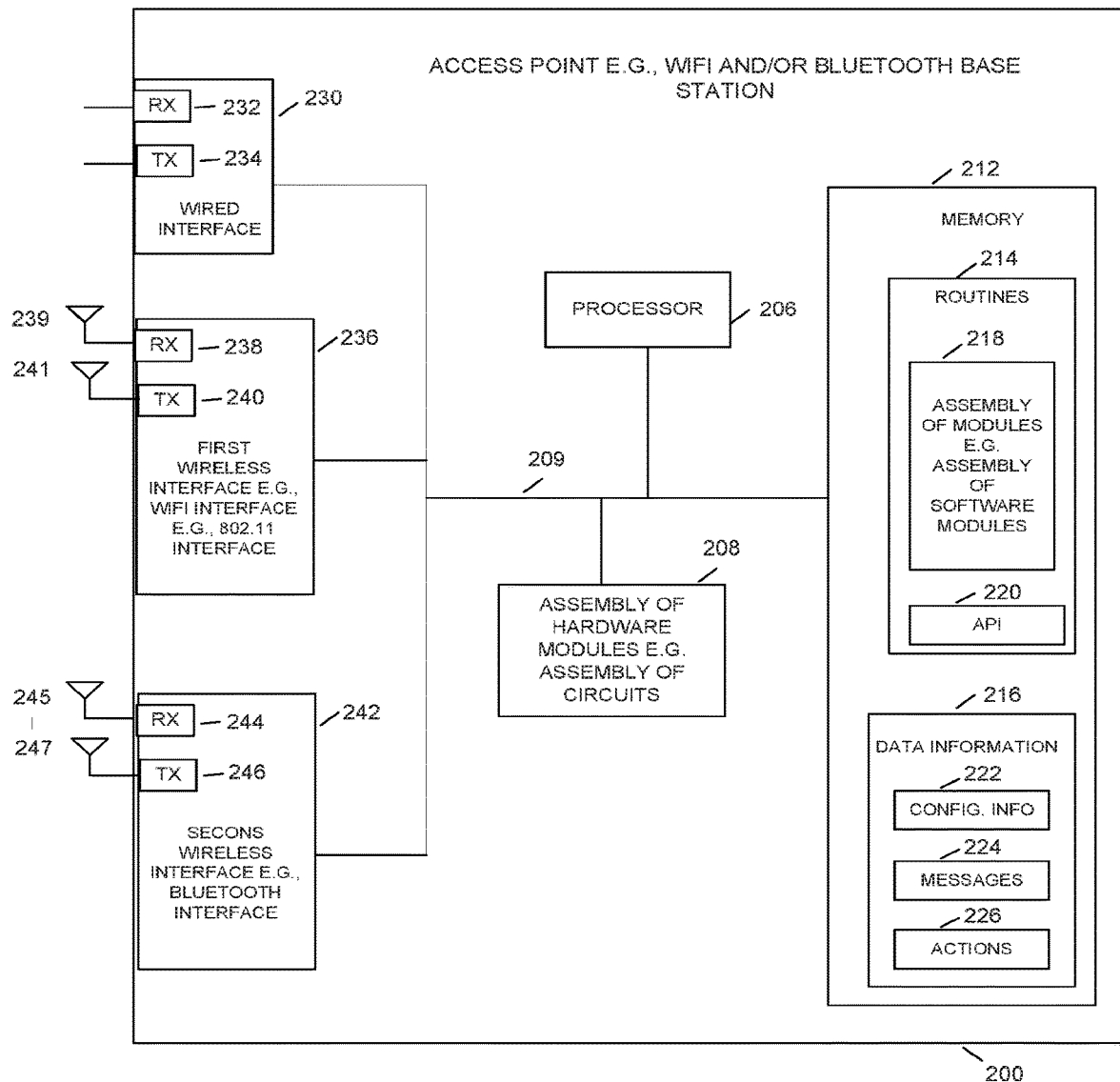
FIG. 2 is a block diagram illustrating an embodiment of an exemplary wireless access point.

FIG. 2 illustrates an exemplary access point 200 (e.g., access points AP 1 142, . . . , APX 144, AP 1' 150, . . . , APX' 152, AP 1" 1 160, . . . , APX" 162, AP 1'" 170, . . . , APX'" 172) in accordance with an exemplary embodiment.

Access point 200 includes wired interfaces 230, wireless interfaces 236, 242, a processor 206, e.g., a CPU, a memory 212, and an assembly of modules 208, e.g., assembly of hardware module, e.g., assembly of circuits, coupled together via a bus 209 over which the various elements may interchange data and information. Wired interface 230 includes receiver 232 and transmitter 234. The wired interface couples the access point 200 to a network and/or the Internet 134 of FIG. 1. First wireless interfaces 236 may support a Wi-Fi interface, e.g. IEEE 802.11 interface, includes receiver 238 coupled to receive antenna 239, via which the access point may receive wireless signals from communications devices, e.g., wireless terminals, and transmitter 240 coupled to transmit antenna 241 via which the access point may transmit wireless signals to communications devices, e.g., wireless terminals. Second wireless interface 242 may support Bluetooth® interface which includes receiver 244 coupled to receive antenna 245, via which the access point may receive wireless signals from communications devices, e.g., wireless terminals, and transmitter 246 coupled to transmit antenna 247 via which the access point may transmit wireless signals to communications devices, e.g., wireless terminals.

Memory 212 includes routines 214 and data/information 216. Routines 214 include assembly of modules 218, e.g., an assembly of software modules, and an Application Programming Interface (API) 220. Data/information 216 includes configuration information 222, message event stream capture 224 and collection of remedial actions 226 to be taken in case of discovery of abnormal message flows.

Figure 3:
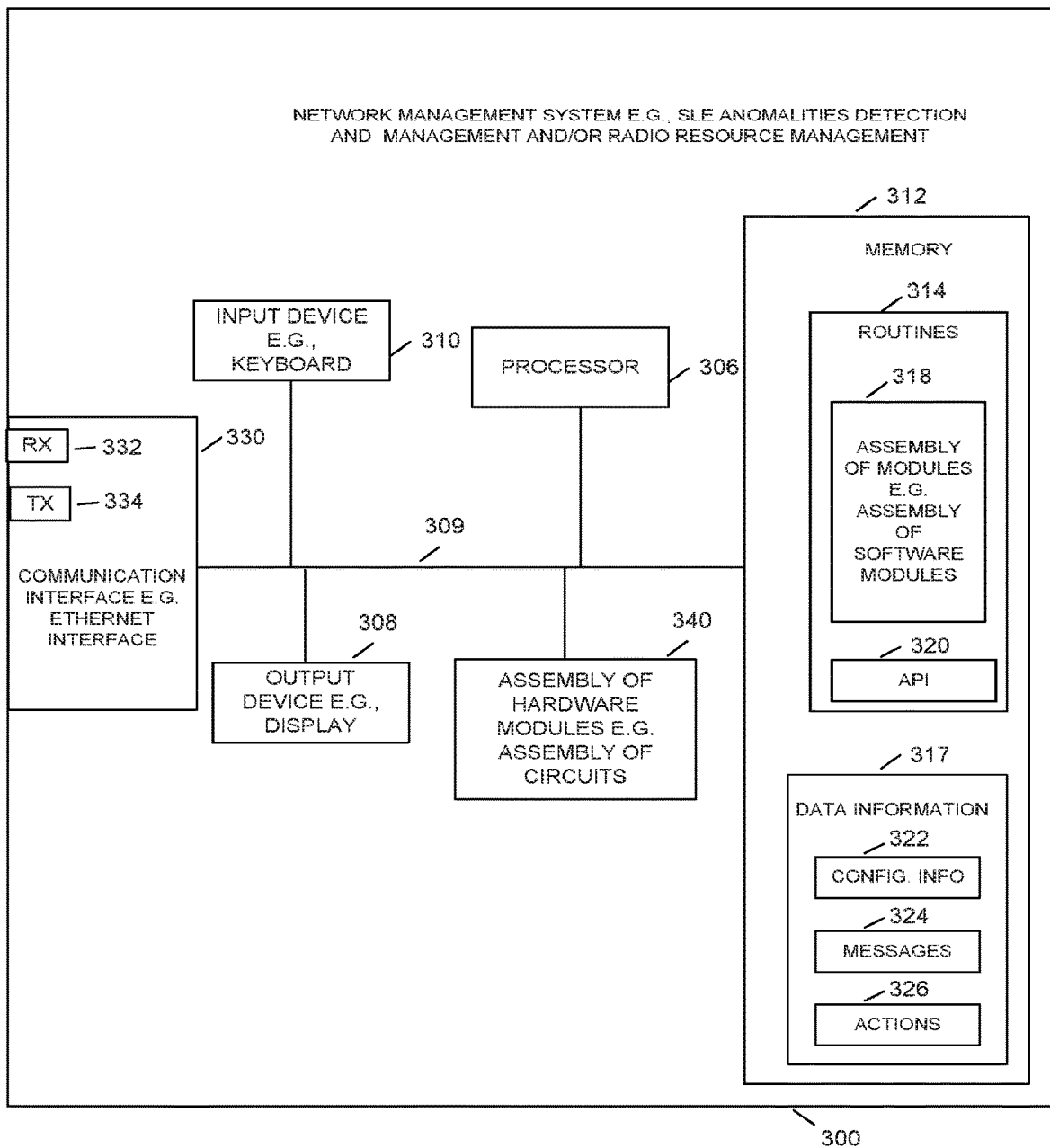
FIG. 3 is a block diagram illustrating an embodiment of an exemplary network management system that determines which SLE deterioration would require manual intervention.

FIG. 3 illustrates an exemplary network management and monitoring system 300, e.g., a wireless system monitoring server, an access point management node, in accordance with an exemplary embodiment. In some embodiments, network monitoring system 300 of FIG. 3 is network management system (NMS) 136 of FIG. 1. Network management system 300 includes a communications interface 330, e.g., an ethernet interface, a processor 306, an output device 308, e.g., display, printer, etc., an input device 310, e.g., keyboard, keypad, touch screen, mouse, etc., a memory 312 and an assembly of modules 340, e.g., assembly of hardware module, e.g., assembly of circuits, coupled together via a bus 309 over which the various elements may interchange data and information. Communications interface 330 couples the network monitoring system 300 to a network and/or the Internet. Communications interface 330 includes a receiver 332 via which the network monitoring system can receive data and information, e.g., including service related information, e.g., message streams, connection time information, and success/failure related information from access points, e.g., for radio connection establishment, AA services, DHCP requests, Simple Notification Service (SNS) look-ups, and Web page requests, and a transmitter 334, via which the network monitoring system 300 can send data and information, e.g., including configuration information and instructions, e.g., instructions to access points to restart, change transmission power, add SSID, etc.

Memory 312 includes routines 314 and data/information 317. Routines 314 include assembly of modules 318, e.g., an assembly of software modules.

Memory 312 includes routines 314 and data/information 317. Routines 314 include assembly of modules 318, e.g., an assembly of software modules, and Application Programming Interface (API) 320. Data/information 317 includes configuration information 322, captured message event stream 324 and collection of remedial actions to be taken in case of discovery of abnormal message flows 326.

The remedial actions may be configured by the system administrator based on past experience. In accordance with some example embodiments, the remedial actions may be downloaded to specific APs. In accordance with other embodiments, the remedial actions are automatically invoked as soon as an abnormal message flow is detected by the messaging model which may reside in memory 312 as well (not shown).

Figure 4:
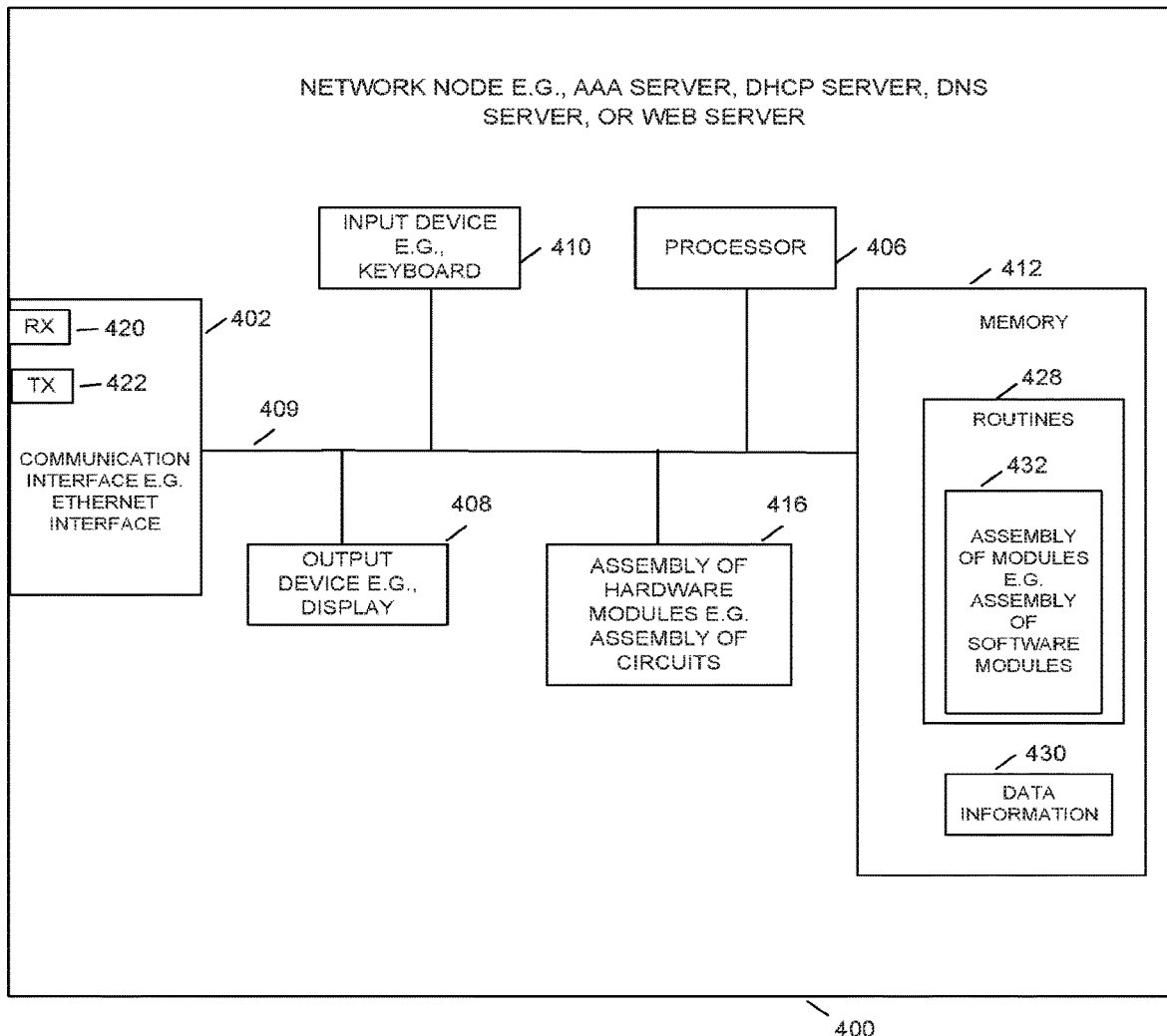
FIG. 4 is a block diagram illustrating an embodiment of an exemplary network node server.

FIG. 4 illustrates an exemplary node server 400, e.g., AA server, DHCP server, DNS server, Web server, etc. In some embodiments, node server 400 of FIG. 4 is server 110, 116, 122, 128, of FIG. 1. Node server 400 includes a communications interface 402, e.g., an Ethernet interface, a processor 406, an output device 408, e.g., display, printer, etc., an input device 410, e.g., keyboard, keypad, touch screen, mouse, etc., a memory 412 and an assembly of modules 416, e.g., assembly of hardware module, e.g., assembly of circuits, coupled together via a bus 409 over which the various elements may interchange data and information. Communications interface 402 couples the network monitoring system 400 to a network and/or the Internet. Communications interface 402 includes a receiver 420 via which the node server can receive data and information, e.g., including operation related information, e.g., registration request, AA services, DHCP requests, Simple Notification Service (SNS) look-ups, and Web page requests, and a transmitter 422, via which the node server 400 can send data and information, e.g., including configuration information, authentication information, web page data, etc.

Memory 412 includes routines 428 and data/information 430. Routines 428 include assembly of modules 432, e.g., an assembly of software modules and data information 430.

Figure 5:
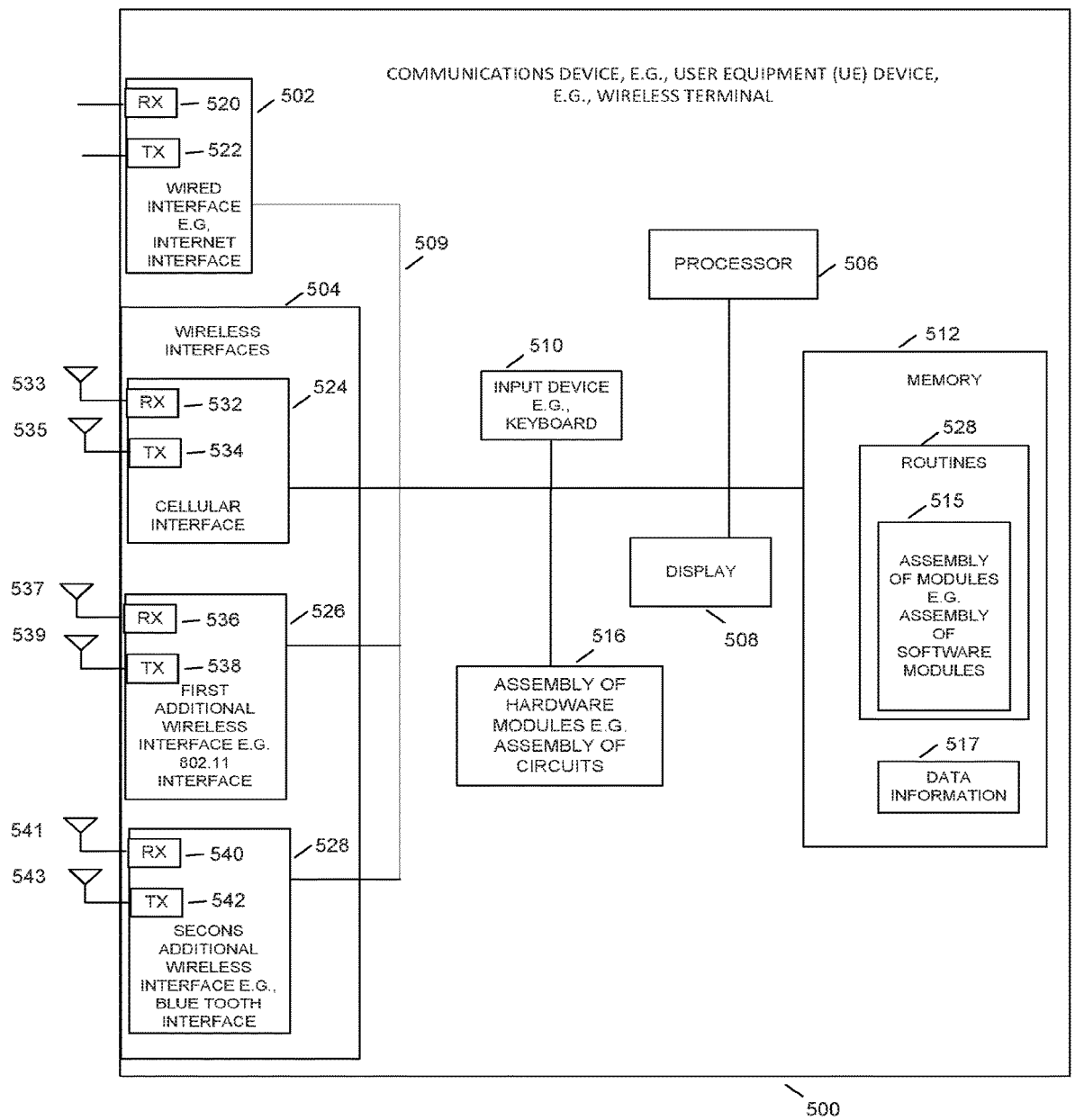
FIG. 5 is a block diagram illustrating an embodiment of an exemplary device such as UE.

FIG. 5 illustrates an exemplary client such as UE 500 (e.g., user equipment UE 1 138, . . . , UE Z 140, UE 1' 146, . . . , UE Z' 148, UE 1" 154, . . . , UE Z" 156, UE 1'" 164, . . . UE Z'" 166) in accordance with an exemplary embodiment.

UE 500 includes wired interfaces 502, wireless interfaces 504, a processor 506, e.g., a CPU, a memory 512, and an assembly of modules 516, e.g., assembly of hardware modules, e.g., assembly of circuits, coupled together via a bus 509 over which the various elements may interchange data and information. Wired interface 502 includes receiver 520 and transmitter 522. The wired interface couples the UE 500 to a network and/or the Internet 134 of FIG. 1.

The exemplary wireless interface 504 can include cellular interface 524, first wireless interface 526, e.g., IEEE 802.11 WiFi interface, and a second wireless interface 528, e.g., Bluetooth® interface. The cellular interface 524 includes a receiver 532 coupled to receiver antenna 533 via which the access point may receive wireless signals from access points, e.g., AP 1 142, . . . , APX 144, AP 1' 150, . . . , APX' 152, AP 1" 1 160, . . . , APX" 162, AP 1'" 170, . . . , APX'" 172, and transmitter 534 coupled to transmit antenna 535 via which the access point may transmit wireless signals to APs, e.g., AP 1 142, . . . , APX 144, AP 1' 150, . . . , APX' 152, AP 1" 1 160, . . . , APX" 162, AP 1'" 170, . . . , APX'" 172. First wireless interfaces 526 may support a Wi-Fi interface, e.g. IEEE 802.11 interface, includes receiver 536 coupled to receive antenna 537, via which the UE may receive wireless signals from communications devices, e.g., APs, and transmitter 538 coupled to transmit antenna 539 via which the UE may transmit wireless signals to communications devices, e.g., APs. The second wireless interface 528 may support Bluetooth® which includes receiver 540 coupled to receive antenna 541, via which the UE may receive wireless signals from communications devices, e.g., APs, and transmitter 542 coupled to transmit antenna 543 via which the UE may transmit wireless signals to communications devices, e.g., APs.

Memory 512 includes routines 528 and data/information 517. Routines 528 include assembly of modules 515, e.g., an assembly of software modules. Data/information 517 may include configuration information as well as any additional information required for normal operations of UE 500.

Figure 6:
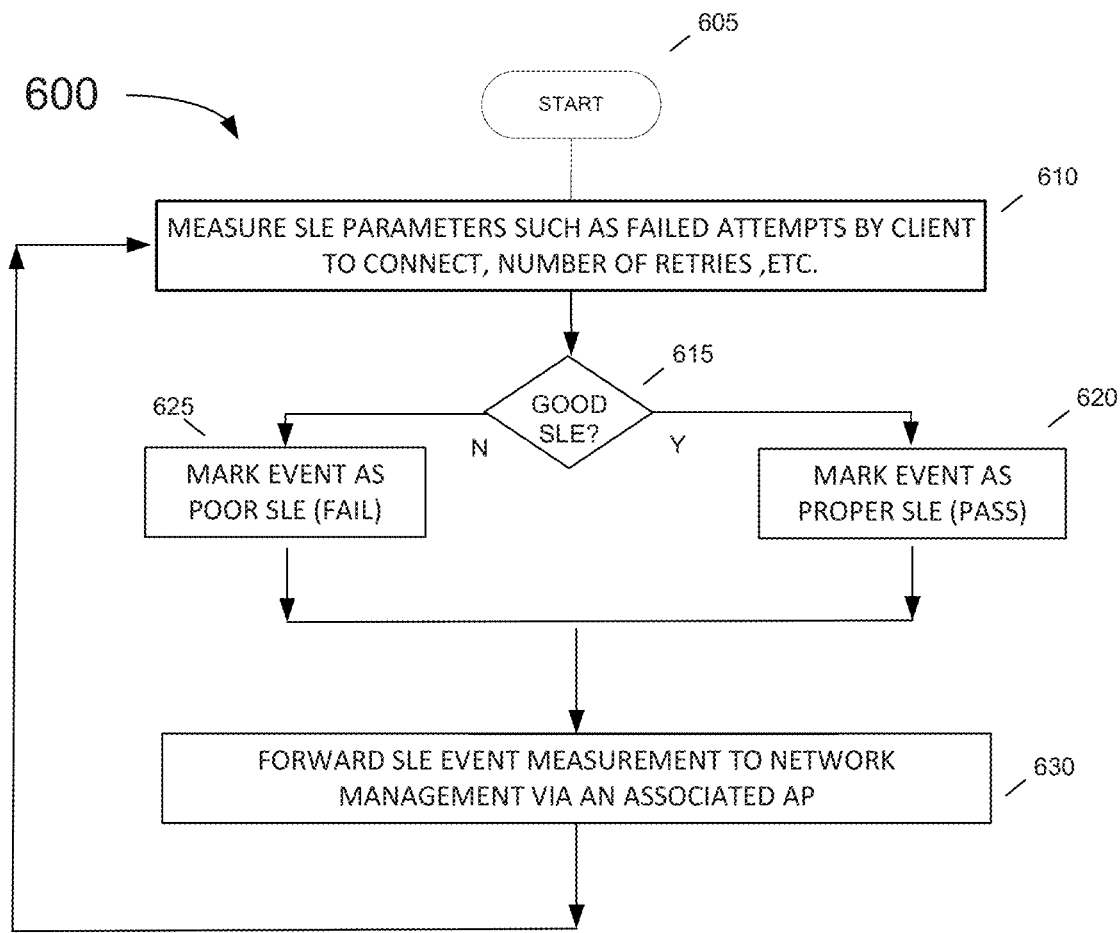
FIG. 6 is a flowchart illustrating an embodiment of an exemplary process for collecting SLE measurements by user equipment client.

FIG. 6 is a flowchart illustrating an exemplary embodiment of process 600 by which a client or user equipment UE such as UEs (UE 1 138, . . . , UE Z 140), (UE 1' 146, . . . , UE Z' 148), (UE 1" 154, . . . , UE Z" 156 and (UE 1'" 164, . . . , UE Z'" 166), collects/measures SLE related parameters.

The process starts in step 605 and proceeds to step 610 where each UE/client observes and measures SLE parameters such as connect time, throughput, coverage, capacity, roaming, AP availability, etc. In accordance with one embodiment some of the parameters, e.g., level of received signal strength indicator (RSSI), are measured by each client and sent via an associated access point (AP) to the network management module over a LAN/WAN. In accordance with one embodiment, the UE compares the RSSI to a predetermined threshold and determines if the RSSI readout corresponds to a good or failed SLE. In accordance with another embodiment, the UE sends raw RSSI information to the network management server 136, and the comparison against the threshold is performed by the network management server. In either case, the network management server maintains the information whether the RSSI (coverage) is proper or failed.

The process proceeds to step 615 where the client determines whether a specific SLE measurement corresponds to a good or failed SLE. If the step determines that the measurement corresponds to a good SLE the process proceeds to step 620 where the method marks the event accordingly as corresponding to a good SLE (pass). However, if it is determined in step 615 that the measurement corresponds to a failed SLE the process proceeds to step 625 where the method marks the event accordingly as corresponding to a poor SLE (fail).

In either case the process continues to step 630 where the collected statistics from the specific event are forwarded via an AP to the network management system 136. The process then loops back to step 610 where the UE continues to measure and assess its SLE parameters and forward them to the network management server via an AP.

Figure 7:
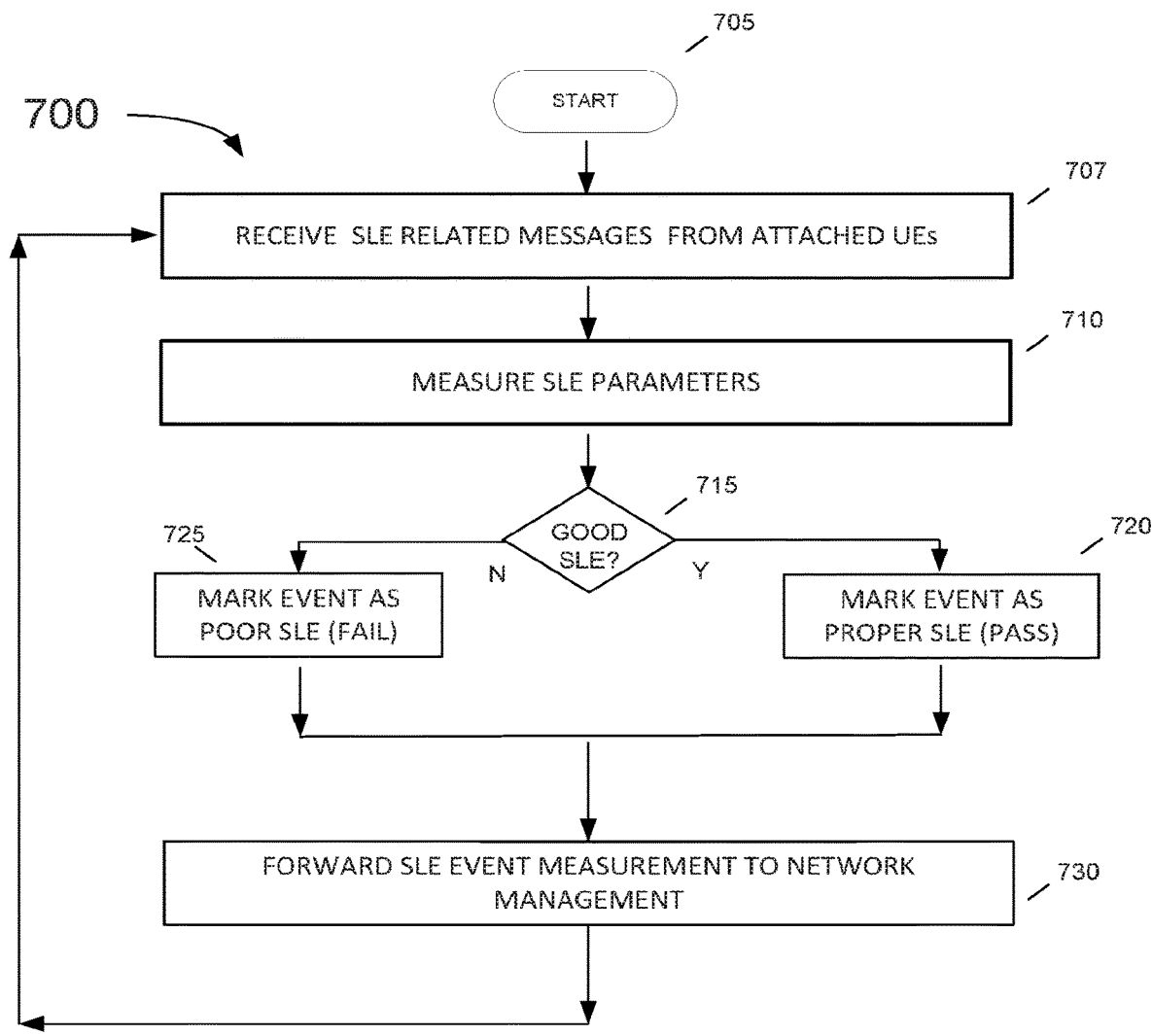
FIG. 7 is a flowchart illustrating an embodiment of an exemplary process for processing SLE measurements by the network management system.

FIG. 7 is a flowchart illustrating an embodiment of an exemplary process 700 by which an AP, such as access points, AP 1 142, . . . , APX 144, AP 1' 150, . . . , APX' 152, AP 1" 1 160, . . . , APX" 162, AP 1'" 170, . . . , APX'" 172, passes through SLE parameters collected by associated UEs as well as collects SLE related parameters and passes them through to the network measurement system 136.

The process starts in step 705 and proceeds to 707 where the AP obtains SLE related messages from the associated UEs. These messages are forwarded to the network management system 136 at a later step 730 which is described below.

In step 710, each AP observes and measures SLE parameters such as connect time, throughput, capacity, roaming, failed attempts by a client to connect to the AP, etc. Those skilled in the art should recognize that some parameters can be measured by either the UE as illustrated in FIG. 6 or by the AP as illustrated by FIG. 7. However, some specific parameters such as failed attempt by a UE to connect via a specific AP can be observed and reported only by the specific AP (since the client may not be able to send messages over the wireless network).

The process proceeds to step 715 where the AP determines whether a specific SLE measurement corresponds to a good or failed SLE. For example, the AP may compare the throughput of a specific client against a predetermined threshold, such as 1.2 Mb/sec. If the step determines that the measurement corresponds to a good SLE, e.g., the throughput is greater than 1.2 Mb/sec, the process proceeds to step 720 where the method marks the event accordingly as corresponding to a good SLE (pass). However, if it is determined in step 715 that the measurement corresponds to a failed SLE, e.g., the throughput is lower than 1.2 Mb/sec, the process proceeds to step 725 where the method marks the event accordingly as corresponding to a poor SLE (fail).

In either case the process continues to step 730 where the collected statistics from the specific event are forwarded vial an AP to the network management system 136. The process then loops back to step 707 where the AP continues to receive SLE messages from associated clients, measure its own SLE parameters and forward the information to the network management server.

Those skilled in the art should recognize that either or both UE process step 615 of FIG. 6 and AP process step 715 of FIG. 7 are optional. In accordance with this embodiment, the UE and the AP may send raw SLE information to the network management module 136, where the assessments whether the SLE measurements correspond to poor or proper SLE will be performed.

Figure 8:
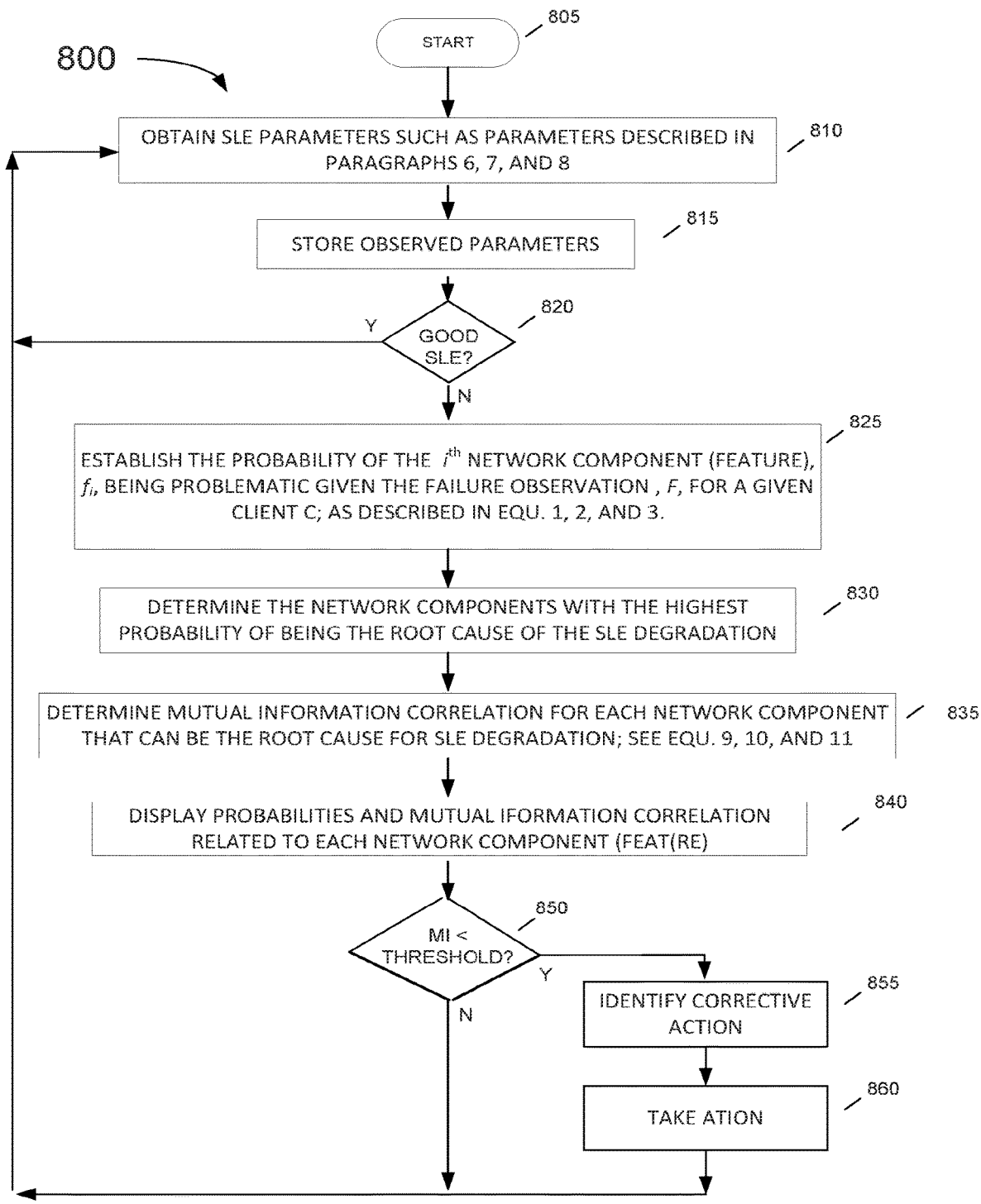
FIG. 8 is a flowchart of an exemplary process performed by the network management system.

FIG. 8 is a flowchart of an exemplary process performed by the network management system 136. The illustrated process starts at step 805 and continues to step 810 where the method obtains SLE parameters such connect time, throughput, coverage (RSSI), capacity, roaming, success to connect, AP availability, count of the number of failed attempts of each specific client over a specific WLAN SSID AP and a specific AP. Some parameters are tracked as raw information. For example, the number of clients that fail to connect via a specific AP is monitored and continuously tracked. Other parameters such as the RSSI seen by a specific client may be compared to a predetermined threshold and the network management module tracks only the number of RSSI occurrences below a predetermined threshold or above a predetermined threshold rather than track the actual value of the RSSI. In accordance with another embodiment, the network management system receives raw RSSI information and determines whether the received information corresponds to a good or failed SLE.

The process proceeds to step 815 where the received SLE information is stored for further analysis to determine root causes for SLE issues. An example of a table 900*a* that stores the received raw SLE related information is provided in FIG. 9*a*.

The process continues to step 820 where the system determines if the events observed above in step 815 relate to a good SLE (pass) or to a poor SLE (fail). The information is stored in table 900*b*. If the messages received by the network management system indicate a good SLE, the method loops back and continues processing received messages with SLE related information originating from the UEs and routed via APs as well as messages with SLE related information originating from the APs. However, if step 820 detects information related to a poor SLE, the process proceeds to step 825.

In step 825 the method uses equations 1, 2, and 3 to establish the probability that the $i^{th}$ network component (feature), fi, is the root cause of the poor SLE (failure), F, observed by client C.

The process continues to step 830 where the method determines the network components with the highest probability of being the root cause of the observed SLE degradation.

The method then proceeds to step 835 where the method uses equation 9, 10 and 11 to establish the mutual information correlation for each network component (feature), fi, which could be the root cause for the poor SLE experienced by the client C.

The process continues to step 840 where the method provides the system administrator with the probabilities for each network component being the root cause of a poor SLE event as well as the mutual information associated with each one of these probabilities. For example, the information could be provided using the output device, e.g., display, 308 of the network management system shown in FIG. 3. Examples of such displays are provided in table 1 as well as in FIGS. 10 and 11 that are discussed in greater detail below.

The process continues to step 850 where the method examines the mutual information correlation associated with one or more network components that have been identified as having the highest probability of being the root cause of the observed poor SLE. For each one of these components the method compares the associated mutual information correlation against a predetermined threshold.

If it is determined in step 850 that the associated mutual information correlation is smaller (greater absolute number) than the predetermined threshold, the method proceeds to step 855 where the system identifies an appropriate action such as restating an offending AP, restarting a specific radio in a given AP, restarting an AAA server, etc. The method then continues to step 860 where the identified action takes place and the process loops back to step 810 where the network management continues receiving SLE related information from the various UEs and APs.

However, if in step 850 the system determines that the mutual information is larger than the threshold, no further action is taken and the process loops back to step 810 where the network management continues receiving SLE related information from the various UEs and APs.

FIG. 9*a* provides a simplified illustration of a table 900*a* used by the network management, e.g., root cause detection and recovery system, 136 of FIG. 1, to store exemplary SLE related measurements as explained above in step 815. Column 905 provides an example of the parameters that are stored. The first set of parameters provides a detailed description of the client and the time it connected to the wireless network: User, Connected Time, IP Address, MAC Address, Device Type, and Device OS. The next set of parameters provides information related to the specific AP via which the client connected to the wireless network: AP Name, SSID, Channel, Band, AP MAC, and BSSID. The last set of parameters provides the level and quality of service the client received via the AP: RSSI, SNR, RX Bit Rate, TX Bit Rate, Total Bytes, RX Bytes, TX Bytes, Total Packets, TX Packets, and Total Retries. Columns 950, 952, 954, and 956 provide measured values for each one of the connection (events) between a specific client and an AP. Though FIG. 9*a* shows only four columns, the actual table can have a very large number of events depending on the number of UEs and on the number of events (connections to the network) that each one of these clients generates.

FIG. 9*b* provides an exemplary illustration of table 900*b* which is used to store the derived exemplary SLE parameters: Success-to-Connect SLE, Time-to-Connect SLE, Coverage SLE, and Throughput SLE. Each one of these parameters is derived in step 820 by comparing the measured SLE parameters against predetermined thresholds.

These parameters are then used in assessing the success and failure rates for each one of the network features as described above in equations 4 through 9.

Figure 10A:
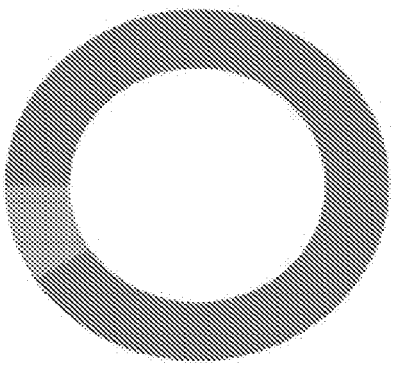
FIGS. 10a-b and 11a-b provide exemplary illustrations of displays of root cause probabilities for observed SLE degradation and the associated scope of impact of each one of the network features (components).

FIG. 10*a* provides an exemplary illustration of a display of the root cause probabilities for observed SLE degradation for a given client, b4:ce:f6:07:cc:3e. Specifically, in this exemplary case, the client failed to connect on 100% of attempts primarily due to authorization problems. This exemplary problem is client-specific, with most client failures occurring on the "Staging near Deanna" access point.

For client b4:ce:f6:07:cc:3e, the pie chart in FIG. 10*a* shows the Bayesian probabilities, which suggests that the client is the biggest issue with 91% likelihood of being the root cause of the observed SLE degradation (failure). The mutual information correlation for ranking clients also acknowledges the same result where that specific client has the lowest (largest negative value) mutual information correlation with failure compared to the rest of clients. The mutual information correlation for other features is negligible relatively.

Figure 10B:
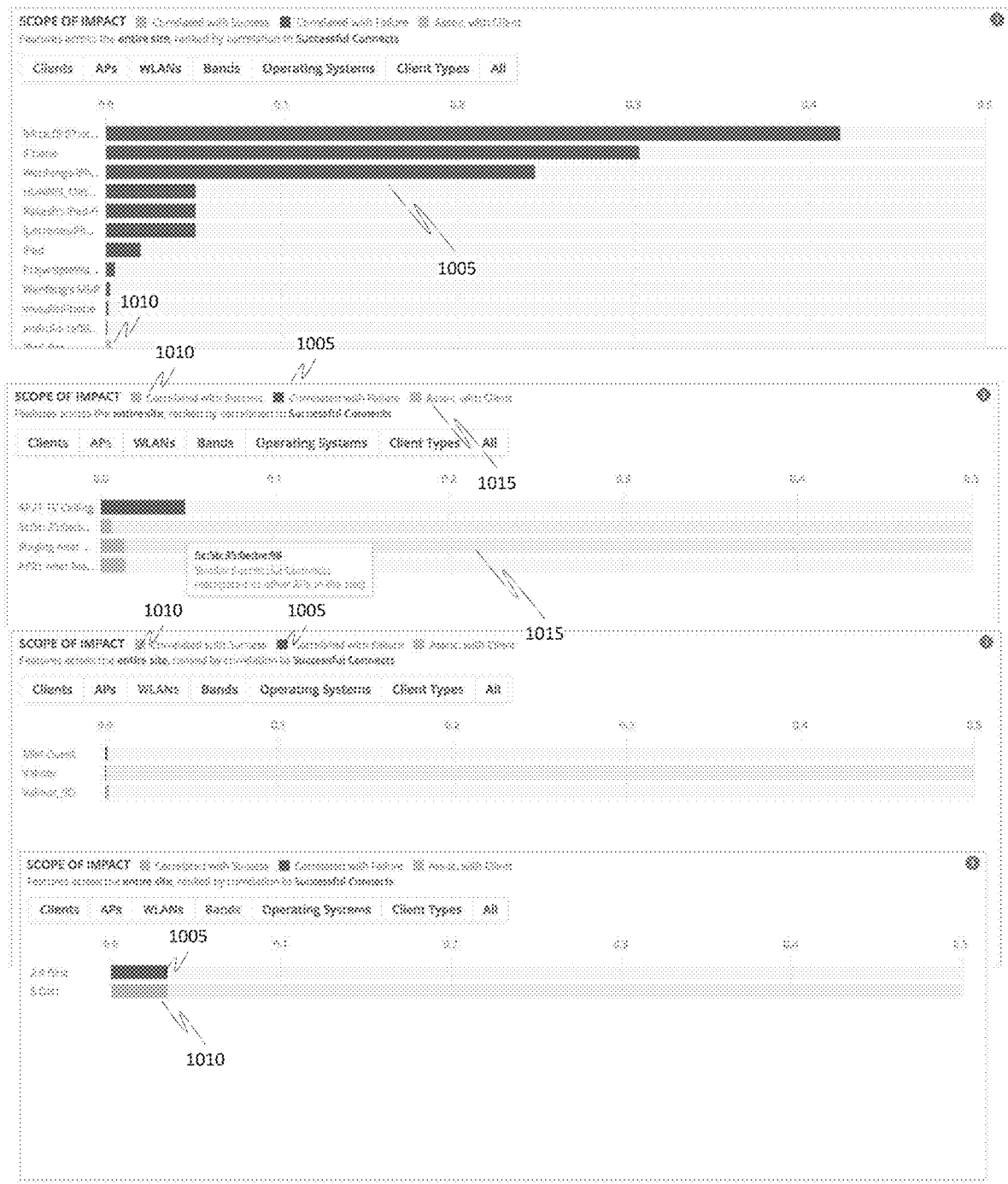

FIG. 10*b* provides an exemplary illustration of displays of the scope of impact (mutual information correlation) of the various features (i.e., network components) of the network such as the various clients, APs, WLANs, Bands, Operating Systems. For each component a negative scope of impact is illustrated red 1005 and the positive scope of impact is illustrated in teal 1010. As explained above in relation with equation 10, a negative scope of impact is indicative of network feature that is related to the SLE failure and a positive scope of impact is indicative that the network feature is not related to the SLE failure. As such, FIG. 10*b* indicates that the specific client b4:ce:f6:07:cc:3e not only has the largest likelihood that it is the root cause of the failure but also that this likelihood has the lowest (largest negative value) mutual information correlation and thus the system can rule with high confidence that this client is the root cause of the SLE degradation.

The yellow highlighting 1015 is used to show the network features (components) used by the b4:ce:f6:07:cc:3e client, the client that experiences the SLE degradation. The AP used by the client has positive (teal) mutual information correlation and as such it can be ruled out from being the root cause of the issue. The WLAN used by the client has a negative, but very small absolute number of mutual information correlation and in addition, as can be seen from FIG. 10*a*, has a zero likelihood of being the root cause of the SLE degradation, as such the WLAN can be ruled out from being a contributor to the SLE degradation. Similarly, the 5 GHz used by the client has a positive scope of impact (mutual information correlation) associated with the failed b4:ce:f6:07:cc:3e client and as such it may be ruled out as being the root cause of the observed SLE degradation.

Figure 11A:
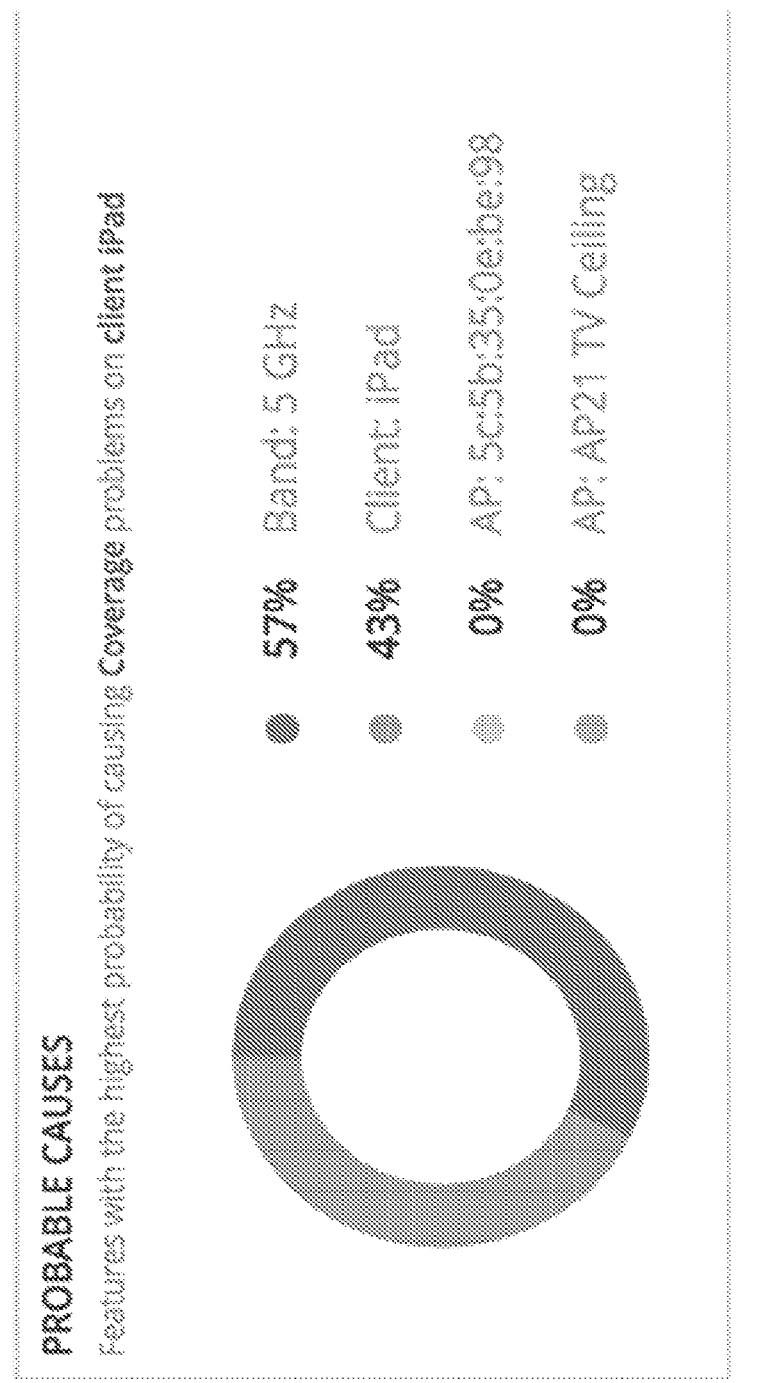

FIG. 11*a* provides another exemplary illustration of a display of root cause probabilities for another observed SLE degradation for client "iPad". In this exemplary case the client "iPad" encountered poor wireless coverage 33% of the time. This problem is affecting a small number of clients, correlating most strongly with the 5 GHz band.

For client "iPad", the pie chart of FIG. 11*a* provides the Bayesian probabilities, which suggests that the 5 GHz frequency band is the biggest likelihood of being the root cause of the observed SLE degradation with probability of 57%, and the feature with the second biggest root cause probability is the client with 43% likelihood.

Figure 11B:

FIG. 11*b* provides an exemplary illustration of displays of the scope of impact (mutual information correlation) of the various features (i.e., network components) of the network such as the various clients, APs, WLANs, Bands, Operating Systems. For each component a negative scope of impact is illustrated in red and the positive scope of impact is illustrated in teal as before. As explained above in relationship with equation 10, a negative scope of impact is indicative of network feature that is related to the SLE failure and a positive scope of impact is indicative that the network feature is not related to the SLE failure. As such FIG. 11*b* indicates that the specific client "iPad" not only has the largest likelihood that it is the root cause of the failure but also that this likelihood has the lowest (largest negative value) mutual information correlation and thus the system can rule with high confidence that this client is the root cause of the SLE degradation.

The yellow highlighting is used to show the network features (components) used by the "iPad" client, the client that experiences the SLE degradation. The APs used by the client have very small negative (red color) mutual information correlation and as such they can be ruled out from being the root cause of the issue. The WLAN used by the client has also a positive mutual information correlation and as such the WLAN can be ruled out from being a contributor to the SLE degradation. However, the 5 GHz used by the client has a negative scope of impact (mutual information correlation) associated with the failed "iPad" client and since per FIG. 11*a* it also has a high likelihood of being the root cause of the observed SLE degradation, the system takes an action of highlighting this component as the offending network feature and restarts the associated radio.

Numerous additional variations on the above described methods and apparatus are possible.

The techniques of various embodiments may be implemented using software, hardware and/or a combination of software and hardware. Various embodiments are directed to apparatus, e.g., mobile nodes, mobile wireless terminals, base stations, e.g., access points, communications system. Various embodiments are also directed to methods, e.g., method of controlling and/or operating a communications device, e.g., wireless terminals (UEs), base stations, control nodes, access points and/or communications systems. Various embodiments are also directed to non-transitory machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order and are not meant to be limited to the specific order or hierarchy presented.

In various embodiments devices and nodes described herein are implemented using one or more modules to perform the steps corresponding to one or more methods, for example, signal generation, transmitting, processing, and/or receiving steps. Thus, in some embodiments various features are implemented using modules. Such modules may be implemented using software, hardware or a combination of software and hardware. In some embodiments each module is implemented as an individual circuit with the device or system including a separate circuit for implementing the function corresponding to each described module. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium e.g., a non-transitory computer readable medium, including machine executable instructions for causing a machine, e.g., processor and associated hardware, to perform one or more of the steps of the above-described method(s). Some embodiments are directed to a device including a processor configured to implement one, multiple or all of the steps of one or more methods of the one exemplary aspect.

In some embodiments, the processor or processors, e.g., CPUs, of one or more devices, e.g., communications devices such as wireless terminals (UEs), and/or access nodes, are configured to perform the steps of the methods described as being performed by the devices. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a communications device, e.g., user equipment, with a processor which includes a module corresponding to each of the steps of the various described methods performed by the device in which the processor is included. In some but not all embodiments a communications device includes a module corresponding to each of the steps of the various described methods performed by the device in which the processor is included. The modules may be implemented purely in hardware, e.g., as circuits, or may be implemented using software and/or hardware or a combination of software and hardware.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of operating a communications device, e.g., a wireless terminal or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, graphical processing unit (GPU), digital signal processing (DSP) unit, etc., configured to implement some or all of the steps of the methods described herein. The processor may be for use in, e.g., a communications device or other device described in the present application.

Numerous additional variations on the methods and apparatus of the various embodiments described above will be apparent to those skilled in the art in view of the above description. Such variations are to be considered within the scope of this disclosure. The methods and apparatus may be, and in various embodiments are, used with BLE, LTE, CDMA, orthogonal frequency division multiplexing (OFDM), and/or various other types of communications techniques which may be used to provide wireless communications links between access nodes and mobile nodes. In some embodiments the access nodes are implemented as base stations which establish communications links with user equipment devices, e.g., mobile nodes, using OFDM and/or CDMA. In various embodiments the mobile nodes are implemented as notebook computers, personal data assistants (PDAs), or other portable devices including receiver/transmitter circuits and logic and/or routines, for implementing the methods.

While exemplary embodiments provide a detailed description of collecting SLE parameters related to clients and APs, those skilled in the art will recognize that the technology is extendable to the case where the system collects parameters related to the operations of other network attached devices, such as AAA servers, DHCP servers, etc., resulting in the ability to detect cases wherein one of the servers associated with the operation of the wireless system is the offending device and automatically remediating the poor SLE by taking a corrective action against the offending device.

In the detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Some embodiments may be used in conjunction with various devices and systems, for example, a User Equipment (UE), a Mobile Device (MD), a wireless station (STA), a wireless terminal (WT), a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an onboard device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA) specifications (Wireless Gigabit Alliance, Inc. WiGig MAC and PHY Specification Version 1.1, April 2011, Final specification) and/or future versions and/or derivatives thereof, devices and/or networks operating in accordance with existing IEEE 802.11 standards (IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.1 lac-2013 ("IEEE P802.1 lac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz", December, 2013); IEEE 802.11ad ("IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", 28 Dec. 2012); IEEE-802.11 REVmc ("IEEE 802.11-REVmc™/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification"); IEEE802.11-ay (P802.11 ay Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment: Enhanced Throughput for Operation in License-Exempt Bands Above 45 GHz)), IEEE 802.11-2016 and/or future versions and/or derivatives thereof, devices and/or networks operating in accordance with existing Wireless Fidelity (Wi-Fi) Alliance (WFA) Peer-to-Peer (P2P) specifications (Wi-Fi P2P technical specification, version 1.5, August 2014) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, or operate using any one or more of the above protocols, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

Some demonstrative embodiments may be used in conjunction with a WLAN (Wireless Local Area Network), e.g., a Wi-Fi network. Other embodiments may be used in conjunction with any other suitable wireless communication network, for example, a wireless area network, a "piconet", a WPAN, a WVAN, and the like.

Some demonstrative embodiments may be used in conjunction with a wireless communication network communicating over a frequency band of 2.4 Ghz, 5 GHz and/or 60 GHz. However, other embodiments may be implemented utilizing any other suitable wireless communication frequency band(s), for example, an Extremely High Frequency (EHF) band (the millimeter wave (mmWave) frequency band), e.g., a frequency band within the frequency band of between 20 GhH and 300 GHz, a WLAN frequency band, a WPAN frequency band, a frequency band according to the WGA specification, and the like.

While the above provides just some simple examples of the various device configurations, it is to be appreciated that numerous variations and permutations are possible. Moreover, the technology is not limited to any specific channels, but is generally applicable to any frequency range(s)/channel(s). Moreover, and as discussed, the technology may be useful in the unlicensed spectrum.

Although embodiments are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments are not limited in this regard, the terms "plurality" and "a plurality" as used herein may include, for example, "multiple" or "two or more". The terms "plurality" or "a plurality" may be used throughout the specification to describe two or more components, devices, elements, units, parameters, circuits, or the like. For example, "a plurality of stations" may include two or more stations.

It may be advantageous to set forth definitions of certain words and phrases used throughout this document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, circuitry, firmware or software, or some combination of at least two of the same. It should be noted that the functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

The exemplary embodiments have been described in relation to communications systems, as well as protocols, techniques, means and methods for performing communications, such as in a wireless network, or in general in any communications network operating using any communications protocol(s). Examples of such are home or access networks, wireless home networks, wireless corporate networks, and the like. It should be appreciated however that in general, the systems, methods and techniques disclosed herein will work equally well for other types of communications environments, networks and/or protocols.

For purposes of explanation, numerous details are set forth in order to provide a thorough understanding of the present techniques. It should be appreciated however that the present disclosure may be practiced in a variety of ways beyond the specific details set forth herein. Furthermore, while the exemplary embodiments illustrated herein show various components of the system collocated, it is to be appreciated that the various components of the system can be located at distant portions of a distributed network, such as a communications network, node, within a Domain Master, and/or the Internet, or within a dedicated secured, unsecured, and/or encrypted system and/or within a network operation or management device that is located inside or outside the network. As an example, a Domain Master can also be used to refer to any device, system or module that manages and/or configures or communicates with any one or more aspects of the network or communications environment and/or transceiver(s) and/or stations and/or access point(s) described herein.

Thus, it should be appreciated that the components of the system can be combined into one or more devices, or split between devices, such as a transceiver, an access point, a station, a Domain Master, a network operation or management device, a node or collocated on a particular node of a distributed network, such as a communications network. As will be appreciated from the following description, and for reasons of computational efficiency, the components of the system can be arranged at any location within a distributed network without affecting the operation thereof. For example, the various components can be located in a Domain Master, a node, a domain management device, such as a MIB, a network operation or management device, a transceiver(s), a station, an access point(s), or some combination thereof. Similarly, one or more of the functional portions of the system could be distributed between a transceiver and an associated computing device/system.

Furthermore, it should be appreciated that the various links, including any communications channel(s)/elements/lines connecting the elements, can be wired or wireless links or any combination thereof, or any other known or later developed element(s) capable of supplying and/or communicating data to and from the connected elements. The term module as used herein can refer to any known or later developed hardware, circuitry, software, firmware, or combination thereof, that is capable of performing the functionality associated with that element. The terms determine, calculate, and compute and variations thereof, as used herein are used interchangeable and include any type of methodology, process, technique, mathematical operational or protocol.

Moreover, while some of the exemplary embodiments described herein are directed toward a transmitter portion of a transceiver performing certain functions, or a receiver portion of a transceiver performing certain functions, this disclosure is intended to include corresponding and complementary transmitter-side or receiver-side functionality, respectively, in both the same transceiver and/or another transceiver(s), and vice versa.

The exemplary embodiments are described in relation to enhanced communications. However, it should be appreciated, that in general, the systems and methods herein will work equally well for any type of communication system in any environment utilizing any one or more protocols including wired communications, wireless communications, powerline communications, coaxial cable communications, fiber optic communications, and the like.

The exemplary systems and methods are described in relation to IEEE 802.11 and/or Bluetooth® and/or Bluetooth® Low Energy transceivers and associated communication hardware, software and communication channels. However, to avoid unnecessarily obscuring the present disclosure, the following description omits well-known structures and devices that may be shown in block diagram form or otherwise summarized.

Exemplary aspects are directed toward:
A method for determining SLE deterioration, identifying its root cause, and taking a corrective action, the method comprising:
collecting SLE related parameters for each UE;
classifying the SLE parameters;
determining network components associated with poor SLE;
identifying the root cause of the SLE deterioration;
taking corrective actions.
Any of the above aspects wherein collecting SLE related parameters comprises of recording the information related to each UE, information related to the access point via which each UE connected (or attempted to connect) to the wireless network, and information related to the quality and amount of service the UE received from the network.
Any of the above aspects wherein the information related to the UE comprises of: User, Connected Time, IP Address, MAC Address, Device Type, and Device OS.
Any of the above aspects wherein the information related to the AP comprises of: AP Name, SSID, Channel, Band, AP MAC, and BSSID.
Any of the above aspects wherein the information related to the SLE comprises of: RSSI, SNR, RX Bit Rate, TX Bit Rate, Total Bytes, RX Bytes, TX Bytes, Total Packets, TX Packets, and Total Retries.
Any of the above aspects wherein classifying the SLE parameters comprises:
comparing the raw SLE against a predetermined or configured parameter;
assigning the SLE parameters values comprising of pass, fail, based on the raw parameter being greater or smaller than the predetermined or configured parameter.
Any of the above aspects wherein identifying offending network components comprises computing the Bayesian probability that a specific network component is the root cause of the SLE degradation;

computing the mutual information related to the hypothesis that a given network;

computing the mutual information correlation related to the hypothesis that a given network component is the offending component causing the SLE deterioration;

selecting the components with the highest Bayesian probability of being the offending components;

comparing the mutual information correlation corresponding to the components which were identified as having the highest probability of being the offending components;

identifying the components with highest probability of being the offending components as being the offending components if the associated mutual information correlation of these components is smaller than a predetermined threshold. (negative and big absolute number).

Any of the above aspects wherein taking corrective actions comprises of one or more actions from displaying a list of the offending network components, displaying the probability of each one of the network components being the offending component, displaying the mutual information correlation that each one of the said components is the offending network component, restarting the offending component.

Additional exemplary aspects are directed toward:

A method to automatically determine a Service Level Experience (SLE) deterioration within a communications network, identify a root cause of the SLE, and take a corrective action, comprising:

collecting, by a network management server, SLE related parameters for a plurality of devices;

classifying, by a processor and memory, the SLE parameters from one or more of the plurality of devices;

determining, by the processor and memory, one or more network components with a poor SLE;

identifying a root cause of the SLE deterioration; and automatically initiating one or more corrective actions.

Any of the above aspects, wherein collecting of the SLE related parameters comprises recording information related to each device, information related to an access point (AP) via which each device connected or attempted to connect to a wireless network, and information related to a quality and amount of service the device received from the network.

Any of the above aspects, wherein the information related to the device comprises one or more of: User, Connected Time, IP Address, MAC Address, Device Type, and Device OS.

Any of the above aspects, wherein the information related to the AP comprises one or more of: AP Name, service set identifier (SSID), channel, band, AP MAC information, and basic service set identifier (BSSID).

Any of the above aspects, wherein the information related to the SLE comprises one or more of: received signal strength indicator (RSSI), signal to noise ratio (SNR), receiver (Rx) Bit Rate, transmitter (Tx) Bit Rate, Total Bytes, received (Rx) Bytes, transmitted (Tx) Bytes, Total Packets, TX Packets, and Total Retries.

Any of the above aspects, wherein classifying the SLE parameters comprises:

comparing a raw SLE against a predetermined or configured parameter; and assigning the SLE parameters values to one of pass or fail, based on the raw parameter being greater or smaller than the predetermined or configured threshold.

Any of the above aspects, wherein identifying offending network components comprises:

computing a Bayesian probability that a specific network component is the root cause of the SLE degradation;

computing a mutual information correlation related to a hypothesis that a given network component is an offending component causing the SLE deterioration;

selecting one or more components with a highest Bayesian probability of being the offending component;

comparing the mutual information correlation corresponding to the components which were identified as having the highest probability of being the offending components; and identifying the components with highest probability of being the offending components as being the offending components when the associated mutual information correlation of these components is smaller than a predetermined threshold.

Any of the above aspects, wherein taking corrective action comprises one or more of: displaying a list of the offending network components, displaying a probability of each one of the network components being the offending component, displaying the mutual information correlation that each one of the said components is the offending network component, restarting the offending component, and/or automatically restarting the offending component.

Any of the above aspects, wherein at least one device of the plurality of devices is user equipment.

Any of the above aspects, wherein the collecting, classifying, determining, and identifying are preformed automatically.

A system to automatically determine a Service Level Experience (SLE) deterioration within a communications network, identify a root cause of the SLE, and take a corrective action, comprising:

a network management server including a processor and memory, the network management server including instructions stored in the memory that when executed by the processor:

collect SLE related parameters for a plurality of devices;

classify the SLE parameters from one or more of the plurality of devices;

determine one or more network components with a poor SLE;

identify a root cause of the SLE deterioration; and automatically initiate one or more corrective actions.

Any of the above aspects, wherein collecting of the SLE related parameters comprises recording information related to each device, information related to an access point (AP) via which each device connected or attempted to connect to a wireless network, and information related to a quality and amount of service the device received from the network.

Any of the above aspects, wherein the information related to the device comprises one or more of: User, Connected Time, IP Address, MAC Address, Device Type, and Device OS.

Any of the above aspects, wherein the information related to the AP comprises one or more of: AP Name, service set identifier (SSID), channel, band, AP MAC information, and basic service set identifier (BSSID).

Any of the above aspects wherein the information related to the SLE comprises one or more of: received signal strength indicator (RSSI), signal to noise ratio (SNR), receiver (Rx) Bit Rate, transmitter (Tx) Bit Rate, Total Bytes, received (Rx) Bytes, transmitted (Tx) Bytes, Total Packets, TX Packets, and Total Retries.

Any of the above aspects, wherein classifying the SLE parameters comprises:
  comparing a raw SLE against a predetermined or configured threshold; and
  assigning the SLE parameters values to one of pass or fail, based on the raw parameter being greater or smaller than the predetermined or configured threshold.

Any of the above aspects, wherein identifying offending network components comprises:
  computing a Bayesian probability that a specific network component is the root cause of the SLE degradation;
  computing a mutual information correlation related to a hypothesis that a given network component is an offending component causing the SLE deterioration;
  selecting one or more components with a highest Bayesian probability of being the offending component;
  comparing the mutual information correlation corresponding to the components which were identified as having the highest probability of being the offending components; and
  identifying the components with highest probability of being the offending components as being the offending components when the associated mutual information correlation of these components is smaller than a predetermined threshold.

Any of the above aspects, wherein taking corrective action comprises one or more of: displaying a list of the offending network components, displaying a probability of each one of the network components being the offending component, displaying the mutual information correlation that each one of the said components is the offending network component, restarting the offending component, and/or automatically restarting the offending component.

Any of the above aspects, wherein at least one device of the plurality of devices is user equipment.

Any of the above aspects, wherein the collecting, classifying, determining, and identifying are preformed automatically.

A non-transitory computer readable information storage media having thereon instructions that when executed perform any one or more of the above aspects.

A system on a chip (SoC) including any one or more of the above aspects.

One or more means for performing any one or more of the above aspects.

Any one or more of the aspects as substantially described herein.

While the above-described flowcharts have been discussed in relation to a particular sequence of events, it should be appreciated that changes to this sequence can occur without materially effecting the operation of the embodiment(s). Additionally, the exemplary techniques illustrated herein are not limited to the specifically illustrated embodiments but can also be utilized with the other exemplary embodiments and each described feature is individually and separately claimable.

The above-described system can be implemented on a wireless telecommunications device(s)/system, such an IEEE 802.11 transceiver, or the like. Examples of wireless protocols that can be used with this technology include IEEE 802.11a, IEEE 802.11b, IEEE 802.11g, IEEE 802.11n, IEEE 802.11ac, IEEE 802.11ad, IEEE 802.11af, IEEE 802.11ah, IEEE 802.11ai, IEEE 802.11aj, IEEE 802.11aq, IEEE 802.11 ax, Wi-Fi, LTE, 4G, Bluetooth®, WirelessHD, WiGig, WiGi, 3GPP, Wireless LAN, WiMAX, DensiFi SIG, Unifi SIG, 3GPP LAA (licensed-assisted access), and the like.

Additionally, the systems, methods and protocols can be implemented to improve one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can benefit from the various communication methods, protocols and techniques according to the disclosure provided herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM4926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the embodiments is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed methods may be readily implemented in software and/or firmware that can be stored on a storage medium to improve the performance of: a programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

It is therefore apparent that there has at least been provided systems and methods for enhancing and improving communications reliability. While the embodiments have been described in conjunction with a number of embodiments, it is evident that many alternatives, modifications and variations would be or are apparent to those of ordinary skill in the applicable arts. Accordingly, this disclosure is intended to embrace all such alternatives, modifications, equivalents and variations that are within the spirit and scope of this disclosure.

The invention claimed is:

1. A network management system comprising:
one or more processors and a memory comprising instructions that when executed by the one or more processors cause the one or more processors to:
classify Service Level Experience (SLE) related parameters, each of the SLE related parameters associated with one or more devices of a plurality of devices of a wireless network;
determine, for one or more devices of the plurality of devices, a probability that a corresponding device of the one or more devices is a root cause of an SLE deterioration within the wireless network based on a classification of one or more SLE related parameters associated with the corresponding device, wherein the probability is determined based on a first probability determined based on a number of uses of the corresponding device and a number of failures associated with the uses of the corresponding device and a second probability determined based on a number of devices of the one or more devices that are associated with a given client device that experienced a failure and a number of failures experienced by the given client device; and
automatically initiate, based on the determined probabilities for the one or more devices of the plurality of devices, one or more corrective actions intended to address the root cause of the SLE deterioration.

2. The network management system of claim 1, wherein the one or more devices comprises one or more of:
a user equipment device;
an access point (AP); or
a server.

3. The network management system of claim 1, wherein at least one of the SLE related parameters is indicative of a quality and amount of data transfer between each of the plurality of devices.

4. The network management system of claim 1, wherein the SLE related parameters indicate one or more of:
a user of a device of the plurality of devices,
a connected time of the device of the plurality of devices,
an IP address of the device of the plurality of devices,
a MAC address of the device of the plurality of devices,
a device type of the device of the plurality of devices, or
an operating system of the device of the plurality of devices.

5. The network management system of claim 1, wherein the SLE related parameters indicate one or more of:
a received signal strength indicator (RSSI),
a signal to noise ratio (SNR),
a receiver (RX) bit rate,
a transmitter (TX) bit rate,
a number of bytes communicated,
a number of received (RX) bytes,
a number of transmitted (TX) bytes,
a number of packets communicated,
a number of transmitted packets,
a number of packet retransmissions, or
a number of failed attempts to connect to the wireless network.

6. The network management system of claim 1, wherein to automatically initiate one or more corrective actions intended to address the root cause of the SLE deterioration, the one or more processors are further configured to perform one or more of:
display a list of at least one device of the plurality of devices associated with the wireless network that is identified as a root cause of the SLE deterioration,
display the determined probability for the at least one device identified as the root cause of the SLE deterioration, and
automatically restart the at least one device identified as the root cause of the SLE deterioration.

7. The network management system of claim 1, wherein to classify SLE related parameters, the one or more processors are further configured to:
compare the SLE related parameters against a threshold; and
assign, based on the comparison of the SLE related parameters against the threshold, a value to the SLE related parameters that indicates the SLE deterioration.

8. A method comprising:
classifying, by a network management system, Service Level Experience (SLE) related parameters associated with one or more devices of a plurality of devices of a wireless network;
determining, by the network management system and for one or more devices of the plurality of devices, a probability that a corresponding device of the one or more devices is a root cause of an SLE deterioration within the wireless network based on a classification of one or more SLE related parameters associated with the corresponding device, wherein the probability is determined based on a first probability determined based on a number of uses of the corresponding device and a number of failures associated with the uses of the corresponding device and a second probability determined based on a number of devices of the one or more devices that are associated with a given client device that experienced a failure and a number of failures experienced by the given client device; and
automatically initiating, by the network management system and based on the determined probabilities for the one or more devices of the plurality of devices, one or more corrective actions intended to address the root cause of the SLE deterioration.

9. The method of claim 8, wherein the one or more devices comprises one or more of:
a user equipment device;
an access point (AP); or
a server.

10. The method of claim 8, wherein at least one of the SLE related parameters is indicative of a quality and amount of data transfer between each of the plurality of devices associated with the wireless network.

11. The method of claim 8, wherein the SLE related parameters indicate one or more of:
a user of a device of the plurality of devices,
a connected time of the device of the plurality of devices,
an IP address of the device of the plurality of devices,
a MAC address of the device of the plurality of devices,
a device type of the device of the plurality of devices, or
an operating system of the device of the plurality of devices.

12. The method of claim 8, wherein the SLE related parameters indicate one or more of:
- a name of an access point of the plurality of devices;
- a service set identifier (SSID) of the wireless network;
- a channel of the wireless network;
- a band of the wireless network;
- a MAC address of the access point of the plurality of devices; or
- a basic service set identifier (BSSID) of the access point of the plurality of devices.

13. The method of claim 8, wherein the SLE related parameters indicate one or more of:
- a received signal strength indicator (RSSI),
- a signal to noise ratio (SNR),
- a receiver (RX) bit rate,
- a transmitter (TX) bit rate,
- a number of bytes communicated,
- a number of received (RX) bytes,
- a number of transmitted (TX) bytes,
- a number of packets communicated,
- a number of transmitted packets,
- a number of packet retransmissions, or
- a number of failed attempts to connect to the wireless network.

14. The method of claim 8, wherein automatically initiating one or more corrective actions intended to address the root cause of the SLE deterioration comprises:
- displaying a list of at least one device of the plurality of devices associated with the wireless network that is identified as a root cause of the SLE deterioration,
- displaying the determined probability for the at least one device identified as the root cause of the SLE deterioration, and
- automatically restarting the at least one device identified as the root cause of the SLE deterioration.

15. The method of claim 8, wherein classifying SLE related parameters comprises:
- comparing the SLE related parameters against a threshold; and
- assigning, based on the comparison of the SLE related parameters against the threshold, a value to the SLE related parameters that indicates the SLE deterioration.

16. Non-transitory computer-readable media storing instructions that when executed cause processing circuitry to perform operations comprising:
- classifying Service Level Experience (SLE) related parameters associated with one or more devices of a plurality of devices of a wireless network;
- determining, for one or more devices of the plurality of devices, a probability that a corresponding device of the one or more devices is a root cause of an SLE deterioration within the wireless network based on a classification of one or more SLE related parameters associated with the corresponding device, wherein the probability is determined based on a first probability determined based on a number of uses of the corresponding device and a number of failures associated with the uses of the corresponding device and a second probability determined based on a number of devices of the one or more devices that are associated with a given client device that experienced a failure and a number of failures experienced by the given client device; and
- automatically initiating, based on the determined probabilities for the one or more devices of the plurality of devices, one or more corrective actions intended to address the root cause of the SLE deterioration.

17. The network management system of claim 1, wherein the SLE related parameters indicate one or more of:
- a name of an access point of the plurality of devices;
- a service set identifier (SSID) of the wireless network;
- a channel of the wireless network;
- a band of the wireless network;
- a MAC address of the access point of the plurality of devices; or
- a basic service set identifier (BSSID) of the access point of the plurality of devices.

* * * * *